(12) United States Patent
Bader

(10) Patent No.: US 9,701,558 B1
(45) Date of Patent: Jul. 11, 2017

(54) METHODS TO TREAT SOURCE WATER FOR OIL-FIELDS HEAVY OIL AND OTHER APPLICATIONS

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 288 days.

(21) Appl. No.: 13/999,309

(22) Filed: Feb. 8, 2014

(51) Int. Cl.
| | | |
|---|---|---|
| *B01D 15/04* | (2006.01) | |
| *C02F 9/00* | (2006.01) | |
| *C02F 1/00* | (2006.01) | |
| *C02F 1/20* | (2006.01) | |
| *C02F 1/44* | (2006.01) | |
| *C02F 1/52* | (2006.01) | |
| *C02F 1/54* | (2006.01) | |
| *B01D 15/00* | (2006.01) | |

(52) U.S. Cl.
CPC .............. *C02F 9/00* (2013.01); *C02F 1/004* (2013.01); *C02F 1/20* (2013.01); *C02F 1/44* (2013.01); *C02F 1/5236* (2013.01); *C02F 1/54* (2013.01); *B01D 15/00* (2013.01)

(58) Field of Classification Search
None
See application file for complete search history.

(56) References Cited

U.S. PATENT DOCUMENTS

| | | | | |
|---|---|---|---|---|
| 2,378,323 A * | 6/1945 | Pomeroy | ............. | B01D 17/047 210/716 |
| 4,770,783 A * | 9/1988 | Gustavsson | ............... | C02F 1/72 210/638 |
| 5,587,088 A * | 12/1996 | Bader | ........................ | C02F 1/54 210/702 |
| 6,663,778 B1 * | 12/2003 | Bader | .................. | B01D 61/147 210/640 |
| 7,392,848 B1 * | 7/2008 | Bader | .................. | B01D 61/025 166/279 |
| 7,934,551 B1 | 5/2011 | Bader | | |
| 7,963,338 B1 | 6/2011 | Bader | | |
| 8,197,696 B1 * | 6/2012 | Bader | ........................ | C02F 1/66 210/639 |
| 8,915,301 B1 * | 12/2014 | Bader | ........................ | C02F 9/00 166/279 |
| 2003/0173297 A1 * | 9/2003 | Grandics | ................ | B01J 20/262 210/650 |

* cited by examiner

*Primary Examiner* — Nina Bhat

(57) ABSTRACT

There is provided herein a system and method for treating source water to remove contaminants such as oil from oil-fields produced water. In some embodiments, source water containing $CO_2$, endotoxins, foulants, sulfate, and oxygen will be treated with aluminum nitrate or iron nitrate, separating the $CO_2$ and endotoxins from the treated water, removing the foulants by mixing hydrated lime and an amine solvent with the treated water, and separating the dissolved oxygen and recovering the amine solvent using a hydrophobic membrane.

28 Claims, 8 Drawing Sheets

METHODS TO TREAT SOURCE WATER FOR OIL-FIELDS HEAVY OIL AND OTHER APPLICATIONS

BACKGROUND OF THE INVENTION

Source Water Specification for OTSG

An arbitrary specification guideline for "once-through-steam generators" (OTSG), the most dominant type in oil-fields applications, was established about fifty years ago for fair quality source water. Since the inception of OTSG coincided with the inception of ion exchanging concept, and both introduced to the market about the same time in the early 1960s, ion exchanging is almost always the prerequisite method to treat source water for OTSG. As such, the guideline is centered on the ion exchanging concept, and remains in use with little changes regardless of source water chemistry. End users' survey of source water specification for OTSG is presented in Table 1.

The specific chemistry of source water, rather than following a guideline which was centered on a predetermined method that may or may not provide proper treatment, should dictate the type of treatment systems. Proper deviations from such a guideline to handle poor quality source water are thus inevitable.

Domestic Wastewater as Source Water for OTSG

Effluents from Wastewater Treatment Plants (WWTP)

Domestic wastewater has diverse characteristics that vary by place and season. The composition of wastewater comprised of inorganics (monovalent and polyvalent ions; boron; and trace transition metals), organics (humic substances; proteins; carbohydrates; fats and fatty acids; and trace priority pollutants and emerging contaminants), microbial (bacteria and virus), nutrients (including phosphorous), and dissolved gases (oxygen, carbon dioxide, ammonia, nitrogen, hydrogen sulfide and methane).

WWTP include: (1) primary treatment to remove the majority of suspended solids; (2) secondary treatment to degrade the biodegradable species by binding organics and nutrients; (3) tertiary treatment to remove a portion of remaining organic and inorganic solids and pathogenic microorganisms through filtration; and (4) disinfection to reduce pathogenic microbes. The secondary treatment (the biological process) can be based on conventional activated sludge, membranes bio-reactors, aerobic granular sludge, or other methods. Since WWTP partially remove contaminants regardless of the biological method, their effluent streams can not be directly reused without further treatment. Therefore, they are often discharged into receiving surface waters. Some of the species of concern for human health and surrounding environment (plants, animals, soils, receiving waters and their aquatic life, etc.) are the organic content (OC), boron, and trace toxic metals.

OC is chemically defined as any material that contains carbon. A biologist or a marine scientist may define OC as a living material or a material that was once alive. Soil scientists define a special type of OC called "humus" as the all-but-stable fraction of soil OC remaining after the plant and animal residues have decomposed. OC is thus connected to life. Consequently, the safety of discharging or reusing effluents from WWTP is globally regulated by national environment agencies.

OC consists of natural organic materials (NOM), microbially produced organic materials (POM), and trace organic materials (TOM). NOM are originated from drinking water; the main source of domestic wastewater. NOM are typically dominated by humic substances.

POM are comprised of extracellular polymeric substances (EPS) and soluble microbial products (SMP). Most bacteria produce EPS that participate in the formation of microbial aggregates whether the bacteria grow in flocs or films or granules. Such a floc or film or granule consists of cells enveloped by a matrix of large EPS.

The formation of ESP may be controlled by different mechanisms such as active secretion, shedding of cell surface material, cell dissolution, and adsorption from surrounding environment. EPS matrices adhere to surfaces, aggregate bacterial cells in flocs or biofilms or granules, stabilize aggregate structure, form a protective barrier that provides resistance to biocides or other sterilizing effects, retain water, absorb exogenous organics for the accumulation of nutrients, accumulate enzymatic activities such as digestion of exogenous macromolecules for nutrient acquisition, and bind with some polyvalent ions. As such, a considerable portion of EPS is associated with the solid phase as insoluble materials (colloids, slimes, and macromolecules) and the rest remains soluble (micro-molecules and dissolved particles smaller than 0.45 µm).

SMP, on the other hand, are soluble cellular species that are released during cell dissolution, diffused through the cell membrane, lost during synthesis, or excreted for some purpose. They are ubiquitously present in effluent streams as evident by their oxygen demand. SMP are divided into two groups: (1) substrate-utilization-associated products (UAP), which are produced directly during substrate metabolism; and (2) biomass-associated products (BAP), which are formed from biomass decay. SMP are the soluble EPS since the sum of UAP and BAP is presumably equal to soluble EPS.

The basic fundamental of EPS (insoluble and soluble) is that they contain electrons and carbon but they are not active microbial cells. The diversion of electrons and carbon is important in wastewater treatment since it affects cell yield and growth rate. The oxygen demand for electron-donor is either shifted to the electron acceptor to generate energy or is converted to biomass. However, when a significant portion of dissolved oxygen is shifted to EPS formation, the oxygen available for synthesizing active biomass is reduced and active biomass yield and specific growth rate decline; a determinant to the efficiency of the biological step in WWTP.

TOM include various priority and emerging organic pollutants such as endocrine disrupting compounds (EDC), pharmaceutically actives compounds (PAC), and personal care products (PCP) that are present in secondary effluents. The presence of such trace pollutants in effluent streams confirms their persistence, as is the case with EPS, through the biological step that embodies short-term aerobic biodegradation.

The bulk of OC is biodegradable. The time for the removal of OC varies with the ability of bacteria to ingest it. Small molecular weight species will be removed from wastewater immediately after it has entered the biological process. Their removal may be completed in 1-2 hours. This group of readily biodegradable species is known as "soft" organics. However, higher molecular weight species will take several hours to be degraded and removed. Yet other species are more recalcitrant (e.g., EPS), and may still be present in effluent streams after several days. Such less readily biodegradable species are of particular interest since they are challenging to digest by the biological process. OC in general (but EPS in particular) is the controlling factor in the biological process.

OC is also the limiting factor of discharging WWTP effluent streams to surface water. Excess OC and nutrients in discharged effluent streams cause primary producers (e.g., algae, plankton and aquatic plants) in receiving surface water to flourish. During the day, primary producers pump oxygen into surface water and at night they remove oxygen. If night-time oxygen removal outpaces day-time replenishment, dissolved oxygen is depleted. This process, called eutrophication, takes place in receiving surface water, often far downstream from where the discharged effluent was introduced. Another way of depleting oxygen from receiving water occurs when secondary producers (the decomposers of primary producers) remove oxygen faster than it can be replaced. Excess OC is usually the cause of this sudden flourishing of decomposers. The depletion of dissolved oxygen due to microbial blooms in this case takes place close to the source of OC discharge. In either situation, aquatic life die once dissolved oxygen in receiving surface waters is depleted at a given time.

To control the biological process within WWTP and/or to measure the oxygen depletion rate in receiving surface waters caused by discharging effluent streams from WWTP, some knowledge of OC load is essential. OC load is therefore measured by three conventional surrogate parameters: total organic carbon (TOC); chemical oxygen demand (COD); and biochemical oxygen demand (BOD). The relation among such parameters is depicted in FIG. 1.

A direct method to determine OC is to measure its total carbon (TC). However, TC is divided further into inorganic carbon (IC) and TOC. IC is comprised of carbonate, bicarbonate, carbonic acid, carboxylic acids, and dissolved $CO_2$. TC is commonly analyzed by combusting a sample at high temperatures and measures the released $CO_2$. Before combustion, IC is typically determined by injecting the sample into a reaction chamber packed with phosphoric acid coated quartz beads. Under such an acidic condition, IC is converted to $CO_2$, but the organically bound carbon is not. TOC is then calculated by subtracting IC from TC. The IC portion of the TC in domestic wastewater is always far higher than the TOC portion due to high alkalinity as well as carboxylic (organic) acids that are negatively charged poly-anions.

OC can also be measured indirectly by quantifying the amount of oxygen needed to chemically or biologically oxidize it. One of the basic measurements is oxygen demand. Oxygen demand is the total amount of oxygen required to aerobically degrade OC. Oxygen demand is further divided into COD and BOD.

COD measures the amount of oxygen needed to oxidize OC using strong chemical oxidants (typically a mixture of potassium dichromate and sulfuric acid). A dilute sample of wastewater is mixed with the oxidant in a heated chamber for two hours. After two hours, the mass of dichromate needed to oxidize OC is measured, and COD is calculated by dividing oxygen equivalents removed by sample volume.

BOD is similar to COD in that it measures the amount of oxygen needed to oxidize OC, except that micro-organisms are used instead of chemical oxidizers. BOD is determined by confining a known amount of a sample in a dark sealed container along with seed bacteria, enough pH buffer, and nutrients. At the start of the test, the sample in the container is saturated with dissolved oxygen.

BOD is divided into four measurements: five-day BOD ($BOD_5$), short-term BOD ($BOD_{ST}$), ultimate BOD ($BOD_u$), and carbonaceous BOD (CBOD). $BOD_5$ is determined by measuring dissolved oxygen removed after five days. The mass of dissolved oxygen removed from the sample after five days is divided by the sample volume to determine $BOD_5$. $BOD_5$ was originally developed to measure the oxygen depletion rate in receiving waters caused by soluble EPS (SMP) in discharged effluent streams from WWTP. It's thus valuable in regulating the composition of effluent streams from WWTP. For managing the biological step within WWTP where knowledge of the organic loading of the influent is required, however, $BOD_5$ is of limited value because of the required 5-days to make the measurement. Thus, $BOD_{ST}$ is introduced to replace $BOD_5$ as a measure of organic influent strength, which can be carried out over a timescale of 30 minutes to several hours. $BOD_u$, on the other hand, is measured by allowing the test to run as long as dissolved oxygen can be removed from the sample (generally 30-60 days).

However, nitrogen compounds also have an oxygen demand (e.g., ammonia removes dissolved oxygen as it is oxidized to nitrate). CBOD is thus measured by adding nitrate inhibitors to the sample container before the test begins, so theoretically, only carbon is oxidized while removing dissolved oxygen. CBOD is related to COD since it measures the maximum amount of oxygen used to consume carbonaceous OC.

Wastewater Treatment & Reclamation Plants (WWTRP)

Since discharging effluent streams into surface waters poses environmental and health risks, their further reclamation is imperative. Water shortage in some arid, semi-arid, or highly populated regions made their reclamation a necessity to alleviate water stress. However, one of the crucial health issues in reclaiming effluents streams from WWTP is the existence of EPS (e.g., endotoxin micro-pollutants). Knowing that it is not possible to control EPS in the biological process, the removal of such pollutants from effluents streams is critical to prevent contamination of potable water resources. For this specific reason, pressure-driven membranes have gained attention for integration with WWTP to further reclaim effluent streams.

WWTRP typically utilize a dead-end microfiltration (MF) or ultra-filtration (UF) setup in conjunction with reverse osmosis (RO) or nanofiltration (NF) setup to improve the quality of effluents from conventional WWTP. The aim of MF or UF is to remove suspended particles, colloids, and pathogens including presumably bacteria, protozoan cysts and viruses. On the other hand, NF or RO is aimed at the removal of dissolved ions (partial removal of monovalent ions in the case of NF), transition metals, phosphorus, and some of boron and dissolved organics. In other words, membranes are used to remove particles based on size exclusion; MF or UF targets the removal of colloids and macro-molecules whereas NF or RO targets the removal of the remaining micro-molecules and some of the dissolved species.

FIG. 2 depicts a generic flow diagram for a WWTRP. The plant consists of four steps: (1) pre-treatment (collection, screening, de-gritting/de-greasing, and chlorinating/de-aerating); (2) biological (conventional activated sludge and sedimentation tanks); (3) filtration (primary screen/disc filtration followed by MF or UF); and (4) reclamation (RO or NF).

Product streams from WWTRP are usually diverted for "indirect potable uses" and/or "direct non-potable uses". The "indirect potable uses" include: (1) recharging groundwater to prevent coastal aquifers from seawater intrusion, replenish declining groundwater level, and store water in aquifers for future use; and (2) blending with drinking water-supply resources (groundwater, rivers, lakes, etc.) before such resources undergo treatment.

On the other hand, the "direct non-potable uses" include: (1) replacing potable water as a feed water for cooling towers or as a make-up water for utility boilers; and (2) replacing potable water as a source water to produce ultra-pure water for industrial applications such as nuclear power plants, semiconductors, and electronics.

RO-based WWTRP started in 1977 with a small plant in Orange County Water, California. From 1998 onwards, after two decades of gained experience from operating an existing plant combined with increasingly water shortage in arid or highly populated areas and the maturity of membranes industry, over a dozen of small RO-based WWTRP (less than 50,000 $m^3$/day) were commissioned (mainly in California, Arizona, Australia, and Singapore). However, a few mega-sized WWTRP were also installed.

Key mega-sized installations include: (1) the 320,000 $m^3$/day SWTRP in Kuwait (primarily used for irrigation, a deviation from probably the original purpose of groundwater replenishment); (2) the 280,000 $m^3$/day Orange County Groundwater Replenishment (GWR) Plant in USA; (3) the 228,000 $m^3$/day plant in Changi, Singapore (primarily used as a source water to generate de-ionized water for the semi-conductor industry for wafer fabrication).

However, the reclamation of WWTP effluents by membranes (UF/RO, MF/RO, etc.) is not widely accepted by many regulating agencies despite of their operations of many years for two critical reasons. The first reason is that RO or NF membranes or even a combination of such membranes partially remove soluble EPS (e.g., endotoxin micro-pollutants) and trace organic pollutants from effluent streams of the biological process. The levels of such toxic species in membranes' product streams are much higher than the ones found in drinking water. Spreading trace toxic species via the practices of "indirect potable uses" to drinking water resources is a rising health concern. EPS, for instance, can pass on many effects on water quality, and therefore they remain the focal point in ensuring public health.

The second reason is that the production of "near distilled water quality" (in terms of dissolved ions) from WWTRP is at the expense of generating copious amounts of concentrate streams (at least 15% of the membranes' feed volume) containing concentrated species by at least about six-times their initial concentrations in membranes' feed streams. Thus, discharging RO or NF concentrate streams from WWTRP into receiving surface waters is far riskier than discharging effluent streams from WWTP.

Direct recycling of such concentrate streams to sewer or WWTRP intakes is not possible since they contain high levels of most organic micro-pollutants, sulfate, and transition metals that would impair the biological process. Recalcitrant organics overload along with high sulfate concentration would occupy a significant portion of dissolved oxygen and thus inhibit both active biomass yield and nitrification in the biological process. Disposal options such as surface waters or deep aquifers might thus be restricted by public awareness, health concerns, tightening regulations, and geology.

Whether using product streams to replenish drinking water supply resources and/or discharging concentrate streams to surface and/or ground waters from WWTRP, dilution with receiving waters is the common theme. However, dilution is not the solution to pollution; it only spreads it wider and further.

Proper ZLD solutions to amend WWTRP or to reclaim WWTP effluents must therefore be sought. The proper solution should target membranes' (RO or NF) feed streams as an effective pre-treatment, or membranes' concentrate streams as a post-treatment, or better yet provide an innovative treatment system to completely depart from the use of such pressure-driven membranes.

Activated Sludge Effluent Streams vs. Membranes' Concentrate Streams from WWTRP

Effluent streams from the biological step are the input to membranes-based (UF-RO) reclamation systems of WWTRP (FIG. 2). As such, characterization of inorganic and organic critical species in an effluent stream is important. In addition, effluent stream is the replacement source water for OTSG when, for example, the membranes-based reclamation system is down for routine maintenance or if it fails. It is thus imperative to establish a valid comparison between activated sludge effluent stream and RO concentrate stream from WWTRP.

Table 2, for example, presents the average species concentrations of the activated sludge effluent stream and the RO concentrate stream from the WWTRP (over a period of two years). Obviously, routine laboratory works extensively target inorganic species but inadequately analyze organic species. The RO concentrate stream has substantially higher levels of critical dissolved inorganic and organic species than the activated sludge effluent stream. Such species, individually or by compounding with other species, form scale deposits, corrosion, bio-fouling, bio-growth, and bio-foaming which impede heat transfer in OTSG. Table 3 summarizes the possible impairment species or compounds and their potential impact on OTSG.

Inorganic Content

The vast majority of inorganic species are highly rejected (99%) by RO. Therefore, the difference in their concentrations between the activated sludge effluent stream and RO concentrate stream is consistent with the reported RO recovery ratio (85%). As such, the concentrations of inorganic species in the RO concentrate stream exceed their correspondent concentrations in the activated sludge effluent stream by about seven-folds.

The ratio of inorganic scale-prone species (bicarbonate, sulfate, phosphate, magnesium, calcium, strontium, barium, transition metals, and silica) to the total inorganic content is about 37% (in terms of meq./L), which is the same in both the RO concentrate stream and the activated sludge effluent stream. This is very important since it implies that the treatment cost of depleting or mitigating such scale-prone species from the activated sludge effluent stream will be substantially lower than the treatment cost of the RO concentrate stream due to their low concentrations.

Four critical sparingly soluble inorganic salts are prone to form scale deposits in OTSG. These salts are magnesium hydroxide, calcium carbonate, calcium sulfates, and calcium phosphates. The last three salts possess inverse-temperature solubility limits, and thus they would deposit preferentially in hotter areas.

The solubility limit of magnesium hydroxide is very low (13 mg/L at ambient temperature) and does not vary with increasing temperatures. However, higher temperatures enhance and agglomerate precipitates of magnesium hydroxide. The induction time of such precipitates is very short (about one second), and decreases sharply with increasing the concentration of magnesium and hydroxide ions.

Sodium chloride concentration in the averaged RO concentrate stream (Table 2) is about 1,700 mg/L. Using my "PRECIP" simulation program, the predicted solubility limits of calcium carbonate and calcium sulfates as a function of temperatures at atmospheric pressure and 1,700 mg/L of sodium chloride are depicted, respectively, in FIGS. 3 and 4. It's anticipated that higher pressures (e.g., 750-1,000 psi in OTSG) would slightly increase the solubility limits of calcium carbonate and calcium sulfates.

Calcium carbonate scale deposits can exist in three forms: vaterite, aragonite, and calcite. Vaterite is the metastable phase of calcite. The difference between aragonite and calcite lies within particles' shape and size of their precipitates. However, the solubility limits of such calcium carbonate forms are nearly identical, extremely low, and inversely proportional with increasing temperature. A depiction of calcite solubility limits as a function of temperatures is shown in FIG. 3.

As temperature rises during water evaporation, calcium sulfate in the form of dihydrate or gypsum ($CaSO_4.2H_2O$) at lower temperatures will be transformed to anhydrite ($CaSO_4$) and hemihydrate ($CaSO_4.\frac{1}{2}H_2O$) forms at high temperatures. As shown in FIG. 4, the solubility limits of the anhydrite and hemi-hydrate forms are not only inversely proportional, but also steeply decreased, with increasing temperatures.

Phosphorus species exist in domestic wastewater as part of living cells. When cells deform or die, they are released to the aqueous phase and become soluble. Soluble phosphorus consist of three different forms: (1) ortho-phosphates ($PO_4^{-3}$, $HPO_4^-$, and $H_2PO_4^-$) that exist in a number of ionic forms and their distribution depends on pH; (2) poly-phosphates and meta-phosphates that are collectively called condensed phosphates since they are formed by the condensation of two or more ortho-phosphates; and (3) organic phosphates that have a carbon backbone. Enzymes in activated sludge convert most of condensed and organic phosphates to ortho-phosphates (to be metabolized by bacteria and used for cells growth).

The most common form of ortho-phosphates is calcium phosphate ($Ca_3(PO_4)_2$). The other forms of ortho-phosphates are calcium phosphates with variable amounts of hydroxide or carbonate or fluoride; known as apatites. Calcium phosphate and apatites possess very limited aqueous solubility limits.

Depending on the temperature, pH, and ionic strength of source water, the precipitation of calcium phosphate may transform through a variety of forms starting from the less stable ones:

amorphous $Ca_3(PO_4)_2$, brushite ($CaHPO_4.2H_2O$), whitlockite ($Ca_3(PO_4)_2.3H_2O$) and octacalcium phosphate ($Ca_4H(PO_4)_3.3H_2O$)

to the most stable forms:

hydroxyapatite ($Ca_5(PO_4)_3.OH$), carboapatite ($Ca_{10}(PO_4)_6.CO_3$) or fluoroapatite ($Ca_5(PO_4)_3F$).

Calcium sulfates and calcium phosphates scale, in particular, are very difficult to mitigate by scale inhibitors. Within the membranes-based part of the WWTRP, they cause severe membranes blockage and hinder steady product stream recovery. Scale inhibitors are primitive in nature with proven limited values in solving sulfates and phosphates scale problems even at ambient temperature, let alone at high temperatures.

In the case of sulfate scale inhibitors, for instance, the temperature tolerance limit for phosphate-based inhibitors is 90° C. while the temperature tolerance limit for polycarboxylates-based or polymeric-based inhibitors is 110° C. The use of such inhibitors is nearly completely ineffective at the designed temperature of OTSG. If not nearly completely depleted from source water, sulfates and phosphates scale treatment will be mechanical, more frequent and costly.

Organic Content

As shown in Table 2, COD was routinely measured. It reflects, to some degree, the overall OC load strength, particularly EPS since they are the main controller of oxygen demand. Comparison of COD measurements between the activated sludge effluent stream and the RO concentrate stream also primitively indicates the collective membranes (UF and RO) rejection abilities of the overall OC. Partial membranes rejection of the overall OC can be inferred from the averaged COD values. OC partial rejection is one of the main reasons for precluding the production of high quality reclaimed water.

As highlighted earlier, POM (insoluble and soluble EPS) that microbially produced in activated sludge tanks (bacteria' factory) were not originally present in the influent wastewater. Some of them leave the activated sludge tanks as sediments (settled flocs or films or granules) and some remain suspended (colloids, macro-molecules, and micro-molecules) in the effluent stream. The importance of the carried over OC with effluent stream stems from two fundamental factors.

The first factor is the polymeric nature and massive production of EPS in activated sludge tanks that roughly constitute 80% of the total suspended mass. The second factor is that bacteria prefer growing in suspension, since suspension unlike flocs or films or granules, does not hinder substrate (nutrients) diffusion. As such, proper growth of a floc or film or granule, and therefore proper sludge settling from the biological process, only occur when the bacteria are diminished or washout. These fundamental factors are vital to understand the fate and implications of EPS on the overall WWTRP processing steps, which in turn, on effectively operating of OTSG.

The average non-volatile TOC (over a period of 2 months) in RO concentrate stream was 56 mg/L. This average value is well below the specified TOC range for OTSG (200-600 mg/L; Table 1). However, RO concentrate stream is a derivative waste stream from a treated domestic wastewater in which its basic treatment is centered on activated sludge to aerobically convert organic carbon in the influent to growing mixed cultures of biomass including aggregate and soluble EPS, some settle out of the effluent and some remain suspended in the effluent. EPS, as produced materials, are primarily negatively charged organic acids. As such, they are eliminated from TOC measurements as part of the inorganic carbon (IC). IC content that also contains organic acids is thus by far exceeding the content of organic carbon. The dominant EPS matrices that are not accounted for in TOC measurements are yet the binding matrices for scale deposits and the main source of bio-growth, bio-fouling and bio-foaming.

This implies that in considering any post treatment method for derivative streams of treated domestic wastewater, one should be prepared to: (1) design the method based not only on removing EPS (insoluble and soluble) and their precursors that further form other harmful by-products but also on providing a stabilizing sink to contain them; (2) utilize more advanced analytical tools to get intrinsic insight on EPS properties and innovatively use such properties to contain them; and therefore (3) not to rely on a meaningless range of a blind lump sum parameter (TOC) that might erroneously be assumed to provide collective information yet "what is" and "what is not" included in such a parameter may not be obvious for an unskilled practitioner or designer.

EPS are bio-polymers that play important roles in wastewater by maintaining cell viability via conserving genetic continuity, storing carbon-based macromolecules, producing or reducing energy, and defending organisms against destructive attack. Like sulfates and phosphates scale, EPS also play different and critical roles in membranes-based WWTRP in terms of membranes rejection ability and membranes bio-fouling. They are destined to play even more significant roles within source water transfer pipelines and OTSG operations in terms of binding inorganic scale deposits, bio-growth, bio-fouling and bio-foaming.

Measuring oxygen demand to assess the impact of a discharged stream on receiving waters is not the focus of OTSG operation. As such, conventional aggregate parameters such as COD, BOD, and even TOC have limited values since they are inadequate in providing any characteristics insight on EPS. Fractionation of EPS using more advanced analytical techniques is the key for meaningful characterization, which in turn, is the path for advancing proper OTSG source water treatment.

In one of my studies, the fractionation of organic content and EPS in particular, using advanced methods (e.g., size-exclusion chromatography, ion-exclusion chromatography, anion-exchange chromatography, hydrophobic-interaction chromatography, gel-filtration chromatography, etc.) along with appropriate analytical techniques was conducted to bridge the lack of knowledge gap about the extent of the actual roles of organic content. FIG. 5 depicts the fractionation of carried over EPS with the effluent stream from activated sludge.

EPS are typically made up of proteins, polysaccharides, lipids, and humic substances. As such, transported EPS with effluent from activated sludge represent complex matrices of multiple species that have individual characteristics (e.g., size, charge, acid-base interaction, hydrophobicity, hydrophilicity, etc.). Yet, they posses a net negative surface charge due to the dominant presence of both hydrophilic and hydrophobic organic acids (poly-anionic) in their makeup.

Proteins are one of the major fractions of EPS. Proteins play several key roles in the formation and aggregation of EPS. The first role is the direct binding of their copious negatively charged hydrophilic amino acids (glutamic and aspartic acids) and polyvalent cations to stabilize EPS aggregate structure. The second role is the contribution of hydrophobic amino acids to bind polyvalent cations and protrude hydrophobic surface characteristics. The third role is that extracellular proteins serve as enzymes to: (1) trap, bind and concentrate organic species within the microenvironment of the embedded cells; and yet (2) degrade polysaccharides in EPS aggregate structure and thus enhancing the release of bio-films bacteria.

EPS also contain significant amounts of humic substances in their structure. Humic substances are hydrophobic polyaromatic compounds with carboxylic and phenolic acids. At lower pH values, the acidity of humic substances provides adsorption sites for polyvalent cations to bind and form insoluble complexes (humates and fulvates). At higher pH values, humic substances adsorb to, or enmesh in, hydroxide precipitates of polyvalent cations.

Microbial polysaccharides constitute a very important fraction of EPS. They are high molecular weight carbohydrate polymers. They are composed of two or more types of mono-saccharides usually present as multiple copies of oligosaccharides containing three to eight residues. Uronic and hydroxyl functional groups are always present in their structures. Polysaccharides exist in activated sludge as Gram-negative bacteria and bacteria alginates.

Polysaccharides Gram-negative bacteria exist at the outer cells' membranes as lipopolysaccharides (LPS) whereas bacteria alginates are secreted as capsular polysaccharides (CPS) forming a discrete surface layer (capsule) associated with the cell surface or excreted as EPS that are only loosely connected with the cell surface. LPS determine the immunogenic properties while CPS are directly associated with pathogenic (e.g., resistance to sterilizing) and surface adherence properties.

LPS are endotoxins (induce a strong response from immune systems) as well as exogenous pyrogens (induce external fever). Disinfection by oxidizing agents may kill most of such micro-organisms. However, if the dead ones are not physically removed from the disinfected stream, they continue to be a supplying source of pyrogens, which is a never-end health hazard in reclaimed domestic wastewater.

LPS consist of three integral parts: (1) A repetitive glycan polymer (O-polysaccharide) that occupies the outermost domain of the LPS molecule; (2) a core that mainly contains oligosaccharides and non-carbohydrates such as phosphate, amino acids, and ethanolamine substituent; and (3) lipid A which is directly attached to the core.

Lipid A (a phosphorylated glucosamine disaccharide) also contains sugars such as heptose and keto-deoxyoctulosonate (KDO) and rapped with multiple carboxylic acids. The hydrophobic carboxylic acids anchor LPS into the bacterial membrane, and the rest of the LPS protrude from the cell surface. Lipid A is responsible for the toxicity of LPS. When bacterial cells are dissolved by the immune system, fragments of cells' membranes containing lipid A are released into the circulation, causing fever, diarrhea, and possible fatal endotoxic shock.

Alginates, on the other hand, are derived from alginic acid. Alginic acid, in which uronic acid is one of its constituents, is a linear copolymer of mannuronic acid and guluronic acid. The residues of alginic acid are organized in blocks of poly-mannuronate (MM) or poly-guluronate (GG) or hetero-polymeric sequences of both acids (MG) to form alginate gels. Such blocks are distributed randomly in the alginate's structure, and each block has its own specific properties. Therefore, alginate manifests a group of gel-forming polymers that consists of the same monomers but with different blocks that contribute unequally to its gel-forming properties.

The distribution of such blocks in alginate's structure varies depending on the nature of the selected biological process in treating domestic wastewater treatment, which dictates the way of growing aggregates (e.g., flocs, films, and granules). GG blocks have higher affinity for ployvalent cations (e.g., calcium, strontium, barium and other transition metals) than the MM or MG blocks. As such, the portion of GG blocks is the most important one for forming a compact gel aggregates. In order to form a strong structural gel, a shift in the uronic acid composition towards guluronic acid over mannuronic acid in the biological process is therefore required.

The cationic binding nature of EPS (proteins, polysaccharides, and humic substances) is important for their function in a mixed media such as wastewater. Under certain conditions, however, they may interact electro-statically with each others since they are charged species resulting in phase transition that unfavorably alter their desirable rheological behavior. To avoid such electrostatic interactions, yet to utilize and strengthen their polymeric (gel-forming) properties, their stabilization should take place at relatively high pH.

I have tested two parallel sets of typical membranes-based reclamation systems (UF-NF and UF-RO) to mainly evaluate the removal of POM (insoluble and soluble EPS). A conventional activated sludge effluent stream from a WWTP was treated with a dead-end UF setup. The molecular weight cut off (MWCO) of the UF membrane is 50 k Daltons (Da); ~0.02 μm nominal pore size. The UF product stream was split and treated by parallel sets of NF and RO membranes. The MWCO of the NF membrane is 0.2 kDa; ~0.001 μm nominal pore size. The recovery ratio of the NF and RO setups was set at 85%. The membranes testing setups are also depicted in FIG. 5. The main findings of the study are summarized as follows.

The hydrophilic portion of the organic content is fractioned using size-exclusion chromatography into four groups based on their molecular weights: (1) polymeric species that include proteins and building blocks of polysaccharides with molecular weights greater than 20 kDa; (2) humic substances with molecular weights between 0.5 and 1 kDa; (3) breakdown products (of proteins, building blocks of polysaccharides, and humic substances) with molecular weights between 0.3 and 0.5 kDa; and (4) lower molecular weight species (<0.3 kDa) including individual monomeric LPS molecules and DBP. On the other hand, the hydrophobic portion of the organic content is accounted for by a hydrophobic-interaction chromatography.

The average rejection of polymeric species by UF was 81%. However, the average rejection of endotoxin LPS was 50%. Further fractionation of the polymeric species, however, revealed that proteins constituted about 91% of such species. Proteins rather than polysaccharides are therefore the dominant polymeric species, which is almost always the case in conventional activated sludge processes. Even though proteins can bind endotoxin LPS aggregates, they also degrade polysaccharides (due to enzymes activities) to form LPS-disaggregates and proteins–LPS complexes:

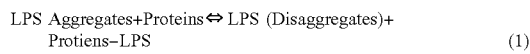

LPS Aggregates+Proteins⇔LPS (Disaggregates)+
    Protiens–LPS                                              (1)

Proteins concentration has therefore a significant effect on binding with LPS, and the amount of endotoxin disaggregation. As the concentration of proteins increases, LPS disaggregation also increases. LPS disaggregates could be complex amphiphilic molecules (micelles or vesicles) and/or individual monomeric LPS molecules with a wide range of molecular weights that approximately extends between 0.2 and 50 kDa (0.001 to 0.02 μm particle sizes). This is below the MWCO of UF membrane (50 kDa), which would explain the low UF rejection for endotoxins LPS.

The hydrophobic fraction was about 8% of the total organic content. The average UF rejection for the hydrophobic fraction was 56%.

The rest of the hydrophilic groups nearly completely exist in the UF product stream since their molecular weights are well below the MWCO of UF membrane. The NF and RO rejection for the rest of the groups varied based on the molecular weights of each group; decreased with the decrease in their molecular weights. There were also insignificant differences between the rejection ability of NF and RO, and the variations in their rejection were within the uncertainties of analytical instruments. The NF and RO rejection of humic substances, breakdown products, and lower molecular weight species were, respectively, 80-85%, 49-56%, 40-47%. On the other hand, the rejection of the hydrophobic fraction by NF and RO was near complete (>99%).

It's interesting to note that the rejection of endotoxin LPS by NF and RO membranes were 81-83%. This falls within the rejection range of species with molecular weights above 0.5 kDa, which is consistent with the molecular weights of the majority LPS disaggregates. However, their removal by NF and RO membranes is far from complete even though the majority of their smallest particle sizes are within or above the nominal pore sizes of NF and RO membranes, especially the RO membranes. The incomplete particle size exclusions of endotoxin LPS along with other smaller molecular weight organics by NF and RO membranes is attributed to bio-films built-up of rejected species at the membrane surface. The contribution of such bio-films is in the forms of fragmentation (due to turbulent flow at the membrane surface) as well as biodegradation (due to aging within membranes' pores) that convert larger endotoxin molecules to smaller ones that could pass through the NF or RO membranes.

The standard unit for reporting endotoxin concentration is the Endotoxin Unit (EU), which is equivalent to 0.1 ng. The concentrations of endotoxin LPS in NF and RO: (1) product streams were 130-210 EU/mL (13,000-21,000 ng/L); and (2) concentrate streams were 4,230-6,510 EU/mL (423,000-651,000 ng/L). A pyrogenic reaction can be caused by only a small amount of endotoxin; as low as 0.1 ng per kg of body weight.

There are four critical implications for such findings; three of them would directly influence the operation of OTSG. The first implication is that depth filtration, a stratified porous medium, can retain particles from activated sludge effluent stream throughout its matrix rather than just on its surface as is the case of UF. Dual media depth filters (e.g., layered hydroantharacite on top of sand) have a high solid handling capacity per unit area of filter used and can process larger volumes of enriched effluent streams high amounts of colloids, cell debris, nucleic acids or even endotoxin.

The second implication is that the recovery ratio of the dead-end UF is about 90%. UF also removes bacteria and therefore it presumably substitutes disinfection by oxidizing agents. The 10% UF reject stream along with its backwash water and cleaning additives are recycled back to the first sedimentation tanks (FIG. 2), which are anaerobic clarifiers to maintain high overall WWTRP recovery. The UF recycled stream is enriched with the rejected recalcitrant species (proteins and building blocks of polysaccharides; and EPS aggregates) that have high oxygen demand along with bacteria and virus. However, sludge sedimentation is influenced by the characteristics of flocs as a function of their physiological state. In other words, the biological process of activated sludge must be operated in a way to allow the formation of easily settling microbial flocs and in a short period of time. Also, proper growth (and therefore proper settling) of flocs only occurs when bacteria are diminished or washout. This is not the case in recycling the UF reject stream which would lead to poor settling sludge (bulking sludge).

Bulking sludge occurs if excessive recalcitrant species are and/or filamentous bacteria (*sphaerotilus natans*, *microthrix parvicela*, and *thiothrix* spp) are present. Filamentous bacteria are filaments of single-cell organisms that attach end-to-end and project out of the flocs. As such, the main reasons for bulking sludge are deficiencies in both dissolved oxygen and nutrients. Recalcitrant species deplete oxygen whereas filamentous bacteria (due to their increased surface-to-mass ratio) compete for substrate to aggregate and therefore overgrow or inhibit the floc-forming organisms.

Filamentous bacteria also cause severe bio-foaming problems. The significant presence of filamentous bacteria is clearly evident by the abnormal foaming of the RO concentrate stream. De-foaming is a must for OTSG operation. However, the foaming problem can be mitigated within the WWTRP by chlorinating the UF reject and backwash water since filamentous bacteria is easily destructible by oxidizing agents.

The effect of bulking sludge on the quality of effluent stream is important since effluent stream is either the input stream for the membranes system of WWTRP or the direct source water for OTSG in the case of the membranes system is down (e.g., maintenance or failure). Carried over microbial POM with activated sludge effluent stream is significant since there is no physical barrier between settling sludge and supernatant within the biological process tanks. As such, bulking sludge (along with foaming) can be further controlled by improving the operation of activated sludge via: (1) chlorinating also the recycled sludge from the secondary to the primary sedimentation tanks (FIG. 2); (2) increasing the ratio of nutrients to micro-organisms to enhance the growth of floc-forming organisms; and (3) enhancing oxygen by proper aeration of activated sludge.

Carried over microbial POM with waste stream resulting from thickening and dewatering of poorly settled sludge (FIG. 2) is another important issue since such a waste stream is about 10% of the total flow and typically recycled back to the first sedimentation tanks (or might be blend with RO concentrate before discharging). Up streams operational issues within WWTRP if persist, even though they are solvable with a proper operation, will be inherited in down streams in which source water (RO concentrate or activated sludge effluent stream) must be properly conditioned for OTSG.

The third implication is that the concentrations of critical organics in activated sludge effluent stream that are commonly assumed insignificant became very significant in the RO concentrate stream. The concentrations of humic substances in RO concentrate stream are about 31-times higher than their correspondent concentrations in activated sludge effluent streams. Whilst the concentrations of breakdown products and lower molecular weight species in RO concentrate stream are about respectively, 8-times and 6-times, higher than their correspondent concentrations in activated sludge effluent stream.

The 50% rejection of endotoxin LPS by UF means that the concentrations of endotoxin in the UF recycled stream is about 6-times higher than their concentrations in the effluent stream. On the other hand, the concentrations of endotoxin in the RO concentrate stream is about 31-times higher than their concentrations in the RO feed (about 6-times higher than endotoxic concentration in the effluent stream). This is almost same with also the rejected hydrophobic fraction. Therefore, the impact of using membranes-based systems to reclaim activated sludge effluent stream is manifested in the significant presence of endotoxin LPS, humic substances, breakdown products, lower molecular weight species, hydrophobic species, and severe foaming problems in the NF or RO concentrate stream.

The fourth implication, which is beyond the operation of OTSG but its worthy of highlighting, is the alarming concentrations of endotoxin in NF and RO product as well as concentrate streams. Such concentrations increase with increasing membranes operation time (due to concentration polarization and species build-up at the membrane surface). The levels of endotoxins in product streams are substantially higher than the detected level of endotoxins in drinking water (1-50 EU/ml). If product water from such membranes-based WWTRP is utilized for "indirect potable uses" such as augmenting drinking water resources (e.g., groundwater), the dilution ratio of their product streams to receiving waters must be considered in terms of endotoxins concentrations. The long term effect of endotoxins on the stored blend water must also be considered.

Endotoxins are also notoriously resistant to destruction by heat (stable at 120° C.), desiccation, pH extremes and various chemical sterilization methods (dead bacterium remain a source of pyrogens if not separated from the stream). In arid or highly populated costal areas, for example, NF and RO concentrate streams from WWTRP are indirect sources of endotoxins to drinking water supplies since such streams are likely to be discharged to the sea. Endotoxins are nearly immune to destruction methods, and de-salted seawater is most likely the primary source of drinking water. Multi-Stage Flash (MSF), the dominant thermal seawater desalination method at its top brine temperature (105-110° C.), for instance, neither destroy nor separate endotoxins and therefore they persists in distillate water.

The Core Theme of this Patent

Organic content in domestic wastewater consists of: (1) natural organics (humic substances) and trace organics (industrial and pharmaceutical chemicals, residual home cleaning and personal care products, and other persistent and disinfectant by products) that originally exist in wastewater influent; and (2) microbial by-products (EPS and dead bacteria endotoxins) that generate during the biological treatment of wastewater. The first type of organics could be reduced by control at the source whereas the second type is not controllable at the source and posses a health risk. The second type is destined to pose major operational problems in OTSG if not properly contained.

In terms of microbial by-products (toxicity, bio-fouling, bio-foaming, and bio-corrosion) and inorganic scale-prone species, RO concentrate streams contain far more concentrations of such constituents than activated sludge effluent streams. For example, in any steam injection project for heavy oil recovery, priority should be given for the use of effluent streams from conventional WWTP over RO concentrate stream for two vital reasons: (1) substantially reduce the cost of source water treatment for OTSG; and (2) unify at least the origin of source water since (a) an activated sludge effluent stream is the replacement for RO concentrate stream when the membranes part of the WWTRP is down for either routine maintenance (typically two weeks per year) or if it fails; and (b) RO concentrate stream may be insufficient to feed OTSG, and produced water would likely be used to supplement the shortage of RO concentrate stream.

However, if the use effluent streams from a conventional WWTP is not an option, then its important to enforce a ZLD treatment system to: (1) make RO concentrate stream sufficient as a source water, and thus avoid the use of produced water and its processing and operation intricacy that increase the treatment cost; and (2) prevent the generation of further harmful waste.

Of equal importance, source water treatment system must be off the beaten path, technically innovative, economical, and environmentally sounds. The key for innovative treatment system is to exploit certain characteristics of microbial by-products (EPS) by coupling them with the chemistry of inorganic scale-prone species and permanently contain them. This is the core theme of this invention.

SUMMARY OF THE INVENTION

In one aspect, the present invention provides a method for separating carbon dioxide, endotoxins, foulants, sulfate, and oxygen from source water to produce properly treated source water. The inventive method comprises the steps of: (a) separating carbon dioxide and endotoxins from source water; (b) separating foulants and sulfate from the de-carbonated and de-toxified source water; and (c) separating oxygen and an amine solvent from the de-foulants and de-sulfated source water to produce properly treated source water. Carbon dioxide and endotoxins are separated from source water in step (a) by: (i) mixing aluminum nitrate or iron nitrate with source water to acidify source water to convert bicarbonate to carbon dioxide and to re-aggregate and separate endotoxins from proteins in source water; and (ii) separating carbon dioxide and endotoxins from source water by a first stage of hydrophobic membranes to produce de-carbonated and de-toxified source water. Foulants and sulfate are separated from the de-carbonated and de-toxified source water in step (b) by: (i) mixing hydrated lime and an amine solvent with the de-carbonated and de-toxified source water in a precipitator unit to form precipitates comprising foulants and sulfate in the form of calcium sulfoaluminate or calcium sulfoferrate to produce de-foulants and de-sulfated source water; (ii) removing precipitates from the de-foulants and de-sulfated source water by a vacuum filter; and (iii) recovering at least most of the remaining amine solvent from the de-foulants and de-sulfated source water by the vacuum filter. Oxygen and amine solvent are separated from the de-foulants and de-sulfated source water in step (c) by a second stage of hydrophobic membranes to produce properly treated source water.

Foulants include magnesium, phosphates, extracellular polymeric substances, silica, boron, transition metals, or a combination thereof.

Source water is effluent stream from wastewater treatment plants, effluent stream from wastewater treatment and reclamation plants, reverse osmosis concentrate stream from wastewater treatment and reclamation plants, nanofiltration concentrate stream from wastewater treatment and reclamation plants, ultrafiltration reject stream from wastewater treatment and reclamation plants, microfiltration reject stream from wastewater treatment and reclamation plants, sludge thickening/dewatering reject stream from wastewater treatment plants, sludge thickening/dewatering reject stream from wastewater treatment and reclamation plants, effluent stream from wastewater treatment plants mixed with oil-fields produced water, effluent stream from wastewater treatment and reclamation plants mixed with oil-fields produced water, reverse osmosis concentrate stream from wastewater treatment and reclamation plants mixed with oil-fields produced water, or a combination thereof.

The amine solvent includes isopropylamine, propylamine, dipropylamine, diisopropylamine, ethylamine, diethylamine, methylamine, dimethylamine, or a combination thereof.

In another aspect, the present invention provides a method for separating carbon dioxide, endotoxins, foulants, sulfate, and oxygen from source water to produce properly treated source water. The inventive method comprises the steps of: (a) separating carbon dioxide and endotoxins from source water; (b) separating foulants and sulfate from the de-carbonated and de-toxified source water; and (c) separating oxygen from the de-foulants and de-sulfated source water to produce properly treated source water. Carbon dioxide and endotoxins are separated from source water in step (a) by: (i) mixing aluminum nitrate or iron nitrate with source water to acidify source water to convert bicarbonate to carbon dioxide and to re-aggregate and separate endotoxins from proteins in source water; and (ii) separating carbon dioxide and endotoxins from source water by a first stage of hydrophobic membranes to produce de-carbonated and de-toxified source water. Foulants and sulfate are separated from the de-carbonated and de-toxified source water in step (b) by: (i) mixing hydrated lime with the de-carbonated and de-toxified source water in a precipitator unit to form precipitates comprising foulants and sulfate in the form of calcium sulfoaluminate or calcium sulfoferrate to produce de-foulants and de-sulfated source water; and (ii) removing precipitates from the de-foulants and de-sulfated source water by a filter press. Oxygen is separated from the de-foulants and de-sulfated source water in step (c) by a second stage of hydrophobic membranes to produce properly treated source water.

In yet another aspect, the present invention provides a method for separating carbon dioxide, endotoxins, foulants, sulfate, and oxygen from source water to produce properly treated source water. The inventive method comprises the steps of: (a) separating carbon dioxide and endotoxins from source water; (b) separating foulants and sulfate from the de-carbonated and de-toxified source water; and (c) separating oxygen and an amine solvent from the de-foulants and de-sulfated source water to produce properly treated source water. Carbon dioxide and endotoxins are separated from source water in step (a) by: (i) mixing calcium nitrate with source water to acidify source water to convert bicarbonate to carbon dioxide and to re-aggregate and separate endotoxins from proteins in source water; and (ii) separating carbon dioxide and endotoxins from source water by a first stage of hydrophobic membranes to produce de-carbonated and de-toxified source water. Foulants and sulfate are separated from the de-carbonated and de-toxified source water in step (b) by: (i) mixing aluminum hydroxide or iron hydroxide, and an amine solvent with the de-carbonated and de-toxified source water in a precipitator unit to form precipitates comprising foulants and sulfate in the form of calcium sulfoaluminate or calcium sulfoferrate to produce de-foulants and de-sulfated source water; (ii) removing precipitates from the de-foulants and de-sulfated source water by a vacuum filter; and (iii) recovering at least most of the remaining amine solvent from the de-foulants and de-sulfated source water by the vacuum filter. Oxygen and amine solvent are separated from the de-foulants and de-sulfated source water in step (c) by a second stage of hydrophobic membranes to produce properly treated source water.

In yet another aspect, the present invention provides a method for separating carbon dioxide, endotoxins, foulants, sulfate, and oxygen from source water to produce properly treated source water. The inventive method comprises the steps of (a) separating carbon dioxide and endotoxins from source water; (b) separating foulants and sulfate from the de-carbonated and de-toxified source water; and (c) separating oxygen from the de-foulants and de-sulfated source water to produce properly treated source water. Carbon dioxide and endotoxins are separated from source water in step (a) by: (i) mixing calcium nitrate with source water to acidify source water to convert bicarbonate to carbon dioxide and to re-aggregate and separate endotoxins from proteins in source water, and (ii) separating carbon dioxide and endotoxins from source water by a first stage of hydrophobic membranes to produce de-carbonated and de-toxified source water. Foulants and sulfate are separated from the de-carbonated and de-toxified source water in step (b) by: (i) mixing aluminum hydroxide or iron hydroxide with the de-carbonated and de-toxified source water in a precipitator unit to form precipitates comprising foulants and sulfate in the form of calcium sulfoaluminate or calcium sulfoferrate to produce de-foulants and de-sulfated source water; and (ii) removing precipitates from the de-foulants and de-sulfated source water by a filter press. Oxygen is separated from the de-foulants and de-sulfated source water in step (c) by a second stage of hydrophobic membranes to produce properly treated source water.

In yet another aspect, the present invention provides a method for separating oil, carbon dioxide, foulants, sulfate, and oxygen from produced water to produce properly treated source water. The inventive method comprises the steps of (a) separating oil and carbon dioxide from produced water, (b) separating foulants and sulfate from the de-oiled and de-carbonated produced water to produce de-foulants and de-sulfated source water; and (c) separating oxygen and an amine solvent from the de-foulants and de-sulfated source water to produce properly treated source water. Oil and carbon dioxide are separated from produced water in step (a) by: (i) mixing aluminum nitrate or iron nitrate with produced water to acidify produced water to convert bicarbonate to carbon dioxide; and (ii) separating oil and carbon dioxide from produced water by a first stage of hydrophobic membranes to produce de-oiled and de-carbonated produced water. Foulants and sulfate are separated from the de-oiled and de-carbonated produced water in step (b) by: (i) mixing hydrated lime and an amine solvent with the de-oiled and de-carbonated produced water in a precipitator unit to form precipitates comprising foulants and sulfate in the form of calcium sulfoaluminate or calcium sulfoferrate to produce de-foulants and de-sulfated source water; (ii) removing precipitates from the de-foulants and de-sulfated source water by a vacuum filter; and (iii) recovering at least most of the remaining amine solvent from the de-foulants and de-sulfated source water by the vacuum filter. Oxygen and amine solvent are separated from the de-foulants and de-sulfated source water in step (c) by a second stage of hydrophobic membranes to produce properly treated source water.

In yet another aspect, the present invention provides a method for separating oil, carbon dioxide, foulants, sulfate, and oxygen from produced water to produce properly treated source water. The inventive method comprises the steps of: (a) separating oil and carbon dioxide from produced water; (b) separating foulants and sulfate from the de-oiled and de-carbonated produced water to produce de-foulants and de-sulfated source water; and (c) separating oxygen from the de-foulants and de-sulfated source water to produce properly treated source water. Oil and carbon dioxide are separated from produced water in step (a) by: (i) mixing aluminum nitrate or iron nitrate with produced water to acidify produced water to convert bicarbonate to carbon dioxide; and (ii) separating oil and carbon dioxide from produced water by a first stage of hydrophobic membranes to produce de-oiled and de-carbonated produced water. Foulants and sulfate are separated from the de-oiled and de-carbonated produced water in step (b) by: (i) mixing hydrated lime with the de-oiled and de-carbonated produced water in a precipitator unit to form precipitates comprising foulants and sulfate in the form of calcium sulfoaluminate or calcium sulfoferrate to produce de-foulants and de-sulfated source water; and (ii) removing precipitates from the de-foulants and de-sulfated source water by a filter press. Oxygen is separated from the de-foulants and de-sulfated source water in step (c) by a second stage of hydrophobic membranes to produce properly treated source water.

Produced water is produced water from conventional oil-gas production, fracwater from shale oil production, fracwater from shale gas production, bitumen-bed produced water, methane-bed produced water, coal-bed produced water, or a combination thereof.

In yet another aspect, the present invention provides a method for separating oil, carbon dioxide, foulants, sulfate, and oxygen from produced water to produce properly treated source water. The inventive method comprises the steps of: (a) separating oil and carbon dioxide from produced water; (b) separating foulants and sulfate from the de-oiled and de-carbonated produced water to produce de-foulants and de-sulfated source water; and (c) separating oxygen and an amine solvent from the de-foulants and de-sulfated source water to produce properly treated source water. Oil and carbon dioxide are separated from produced water in step (a) by: (i) mixing calcium nitrate with produced water to acidify produced water to convert bicarbonate to carbon dioxide; and (ii) separating oil and carbon dioxide from produced water by a first stage of hydrophobic membranes to produce de-oiled and de-carbonated produced water. Foulants and sulfate are separated from the de-oiled and de-carbonated produced water in step (b) by: (i) mixing aluminum hydroxide or iron hydroxide, and an amine solvent with the de-oiled and de-carbonated produced water in a precipitator unit to form precipitates comprising foulants and sulfate in the form of calcium sulfoaluminate or calcium sulfoferrate to produce de-foulants and de-sulfated source water; (ii) removing precipitates from the de-foulants and de-sulfated source water by a vacuum filter; and (iii) recovering at least most of the remaining amine solvent from the de-foulants and de-sulfated source water by the vacuum filter. Oxygen and amine solvent are separated from the de-foulants and de-sulfated source water in step (c) by a second stage of hydrophobic membranes to produce properly treated source water.

In yet another aspect, the present invention provides a method for separating oil, carbon dioxide, foulants, sulfate, and oxygen from produced water to produce properly treated source water. The inventive method comprises the steps of: (a) separating oil and carbon dioxide from produced water; (b) separating foulants and sulfate from the de-oiled and de-carbonated produced water to produce de-foulants and de-sulfated source water; and (c) separating oxygen from the de-foulants and de-sulfated source water to produce properly treated source water. Oil and carbon dioxide are separated from produced water in step (a) by: (i) mixing calcium nitrate with produced water to acidify produced water to convert bicarbonate to carbon dioxide; and (ii) separating oil and carbon dioxide from produced water by a first stage of hydrophobic membranes to produce de-oiled and de-carbonated produced water. Foulants and sulfate are separated from the de-oiled and de-carbonated produced water in step (b) by: (i) mixing aluminum hydroxide or iron hydroxide with the de-oiled and de-carbonated produced water in a precipitator unit to form precipitates comprising foulants and sulfate in the form of calcium sulfoaluminate or calcium sulfoferrate to produce de-foulants and de-sulfated source water; and (ii) removing precipitates from the de-foulants and de-sulfated source water by a filter press. Oxygen is separated from the de-foulants and de-sulfated source water in step (c) by a second stage of hydrophobic membranes to produce properly treated source water.

This invention is of particular interest in connection with applications such as, but not limited to, oil and gas production, shale oil and gas production, bitumen (sandy oil) and gas production, wastewater treatment and reclamation, saline water desalination, mining, geothermal power plants, flue gas desulphurization, gypsum production, coal or oil fired power plants, industrial boilers, cooling towers, agricultural drainage water, textile, treatment of contaminated water sources such as surface or ground water by natural brine or oil-gas fields brine or brine resulting from all kinds of mining operations (sparingly soluble inorganics, toxic metals, lanthanides, actinides, etc.), and treatment of natural brine or oil-gas fields brine or brine resulting from all kinds of mining operations to prevent contaminating surface or ground water.

This invention is not restricted to use in connection with one particular application. This invention can be used, in general, for the effective recovery of oil and/or the selective removal of critical inorganic and organic species from different source water with precipitates ranging from macro- to submicron-sizes. Further objects, novel features, and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

The Precipitation Concept

Figure 1:
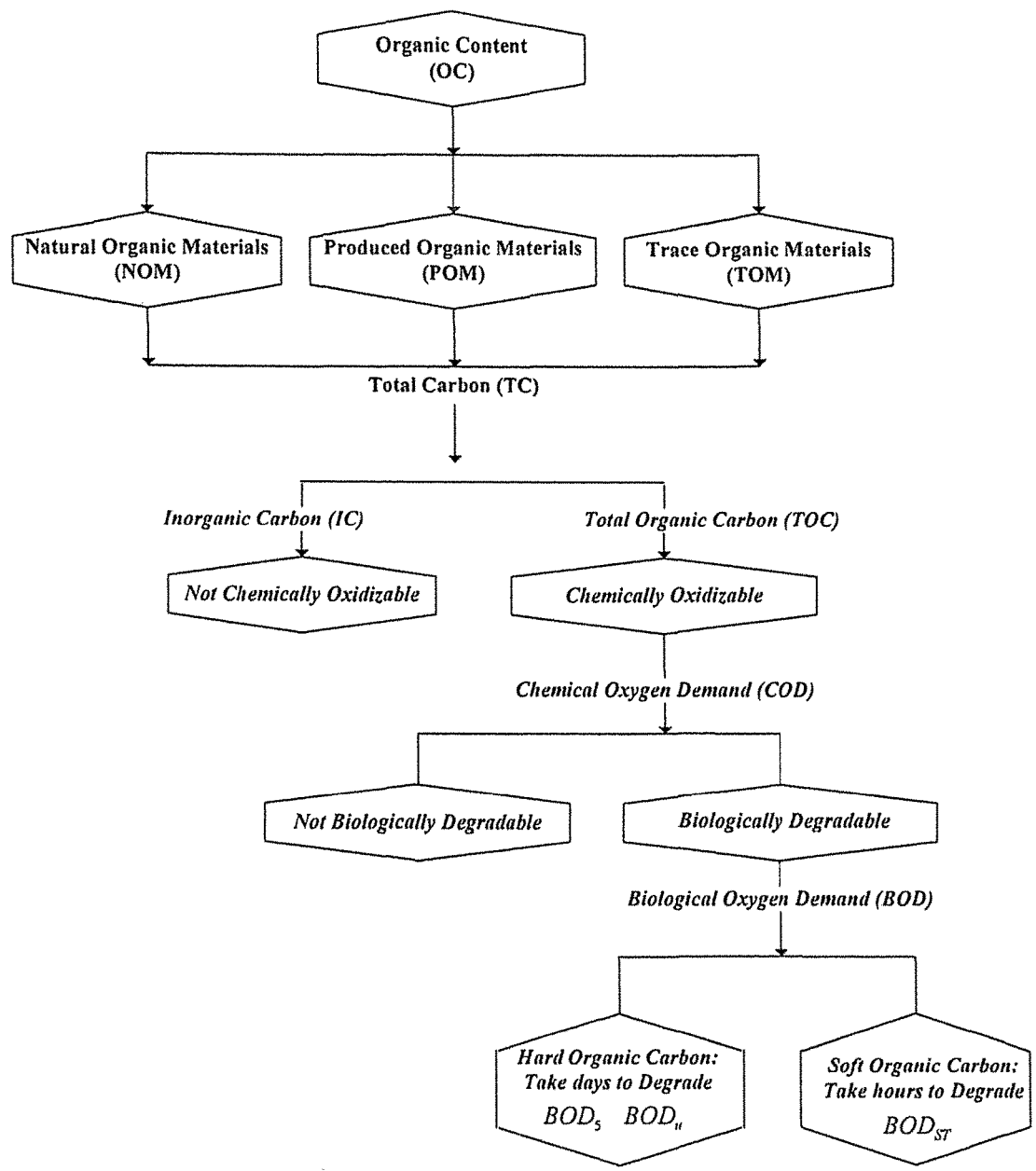
FIG. 1 illustrates organic content in wastewater and its conventional surrogate parameters.
Figure 2:
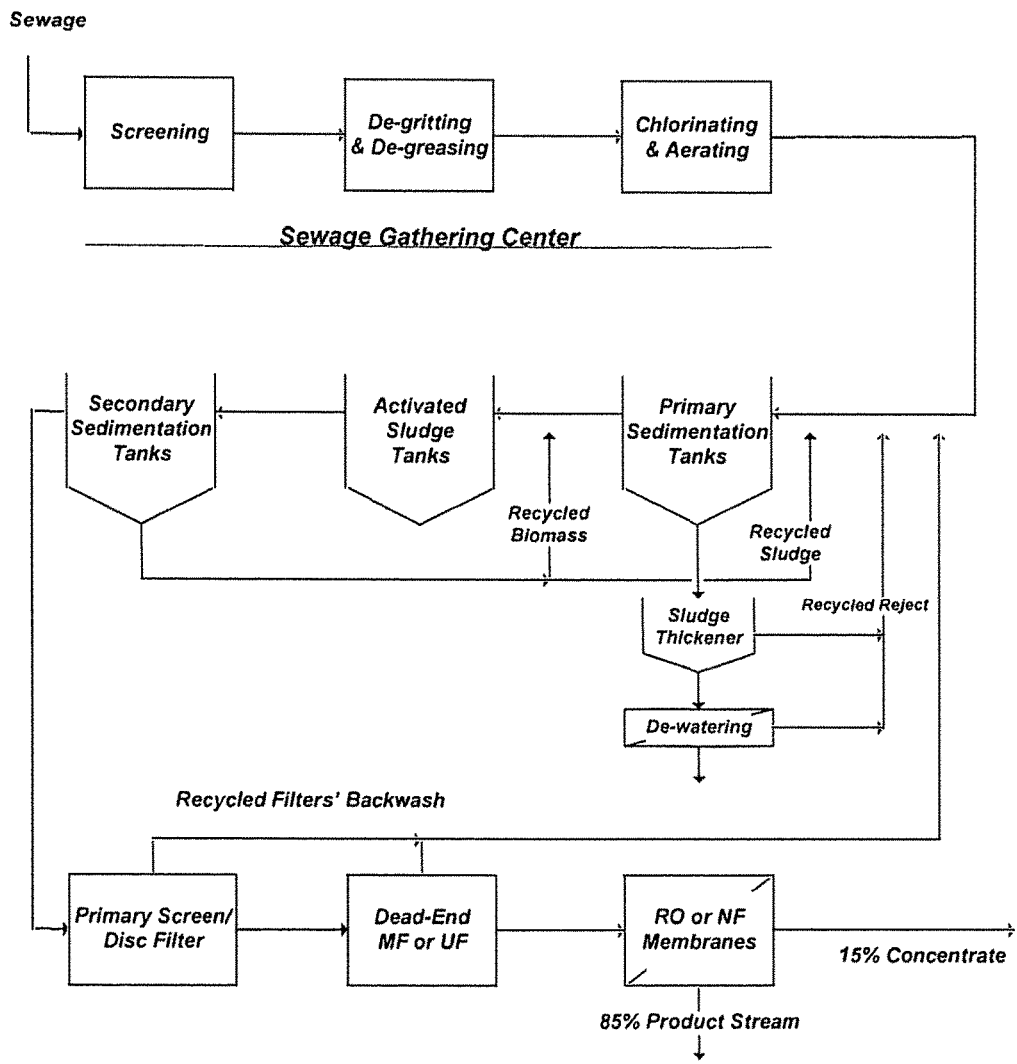
FIG. 2 illustrates a generic flow diagram for WWTRP.
Figure 3:
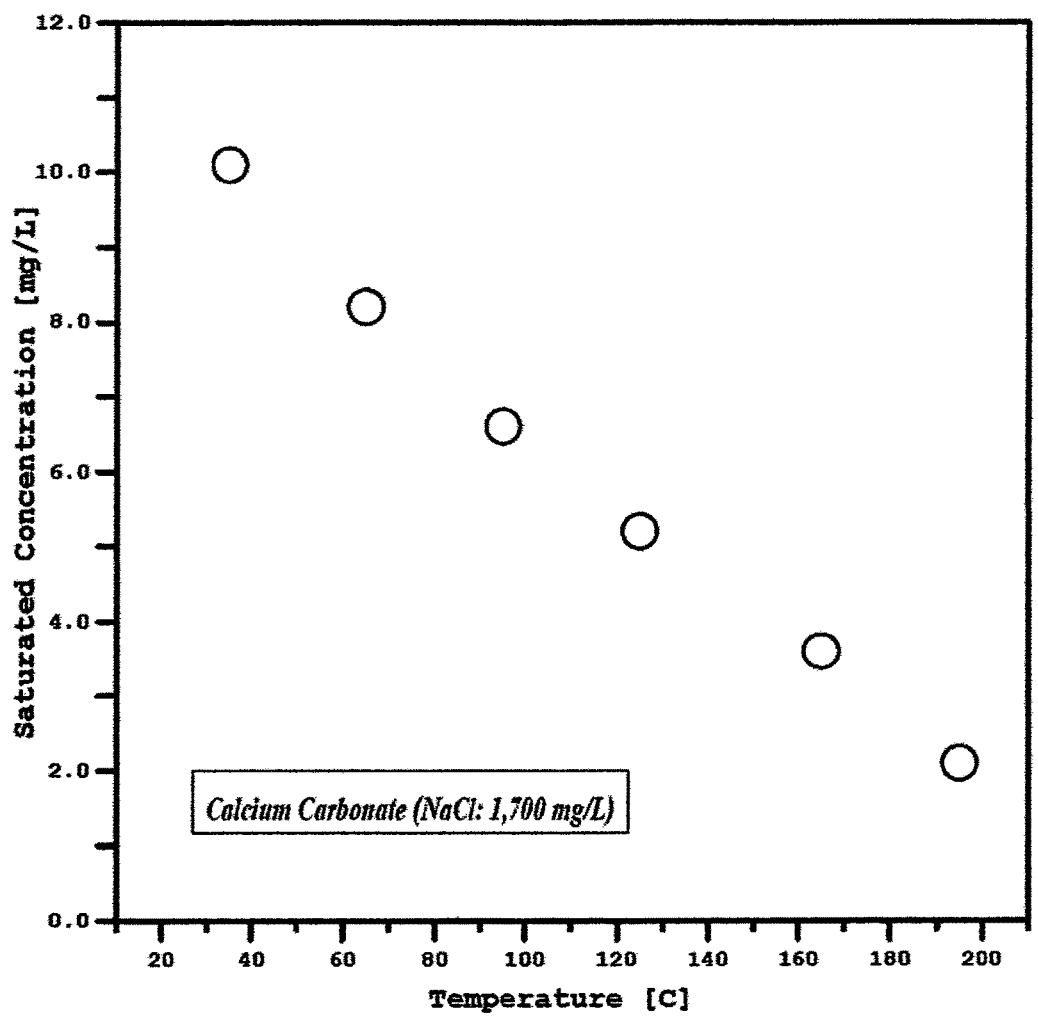
FIG. 3 illustrates the saturation limits of calcium carbonate.
Figure 4:
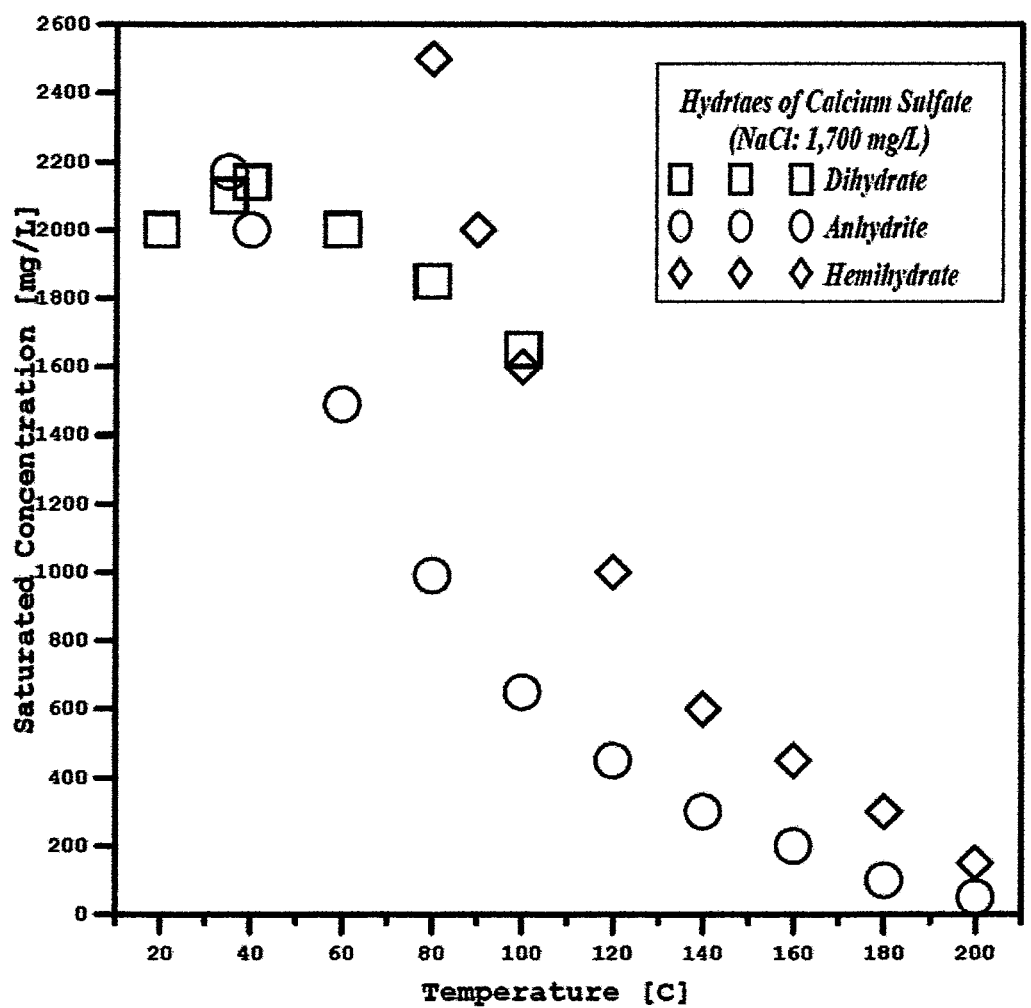
FIG. 4 illustrates the saturation limits of calcium sulfates.
Figure 5:
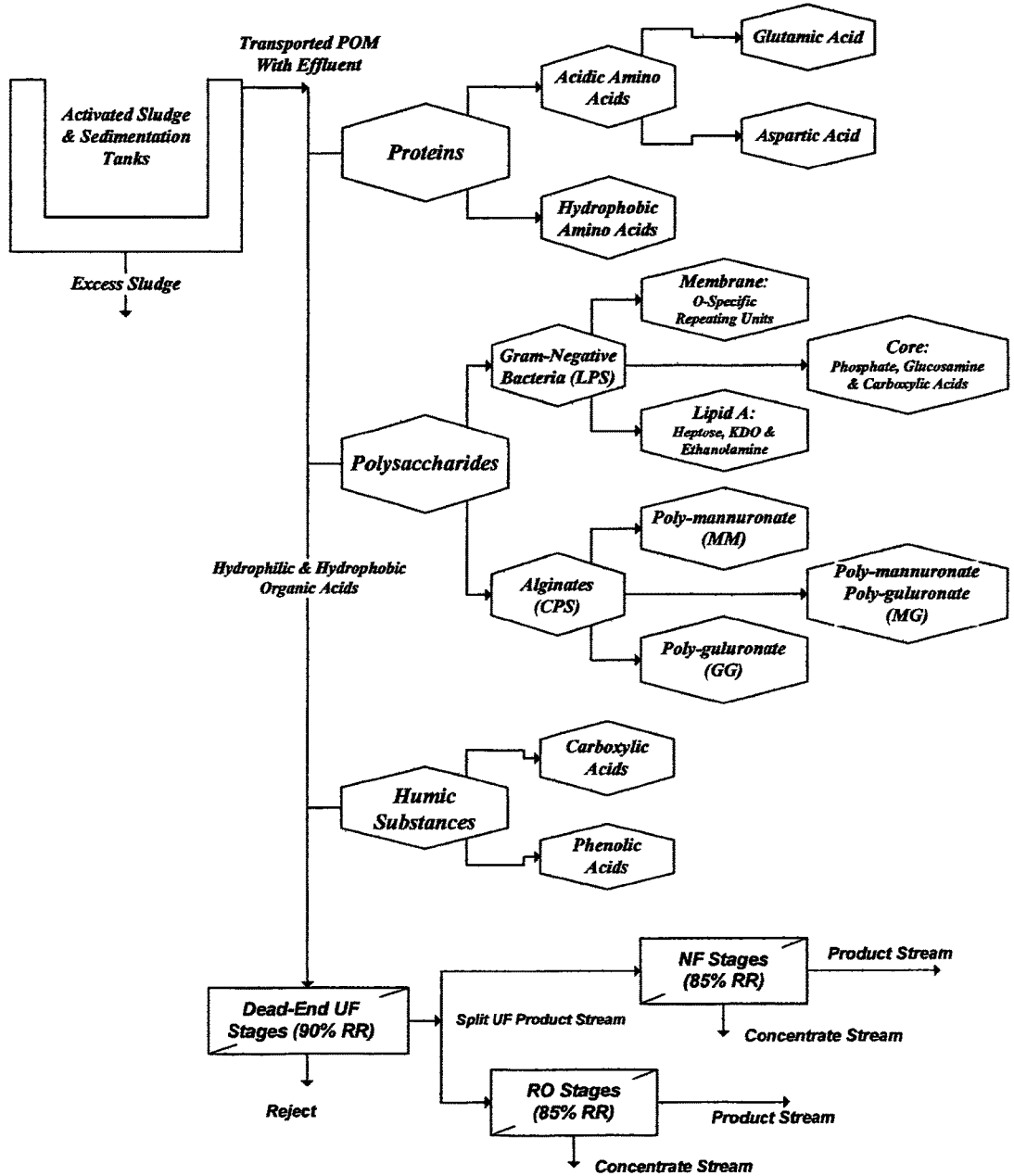
FIG. 5 illustrates the fractionation and characterization of organic content in terms of POM (EPS).

I have previously invented the Liquid-Phase Precipitation (LPP) process for the separation of ionic species from aqueous streams. LPP is based on mixing an aqueous stream with a suitable solvent at ambient temperature and atmospheric pressure to form selective precipitates. The suitable solvents are those which have the capability to meet two basic criteria.

The first criteria is the suitability to precipitate targeted ionic (charged) inorganic and organic species from aqueous solutions. The selected organic solvent must be miscible with the aqueous phase. Of equal importance, the targeted ionic species must be sparingly soluble in the organic solvent. The addition of such a solvent to an ionic-aqueous solution leads to the capture of part of the water molecules and reduces the solubility of ionic species in the water which form insoluble precipitates. The solubility of the targeted ionic species in the organic solvent is a critical factor in achieving the degree of saturation. Therefore, solubility related factors such as ionic charge, ionic radius, and the presence of a suitable anion in the aqueous solution play an important role in affecting and characterizing precipitates formation.

The second criteria is suitability for overall process design. For ease of recovery, the selected solvent must have favorable physical properties such as low boiling point, high vapor pressure, high relative volatility, and no azeotrope formation with water. From a process design standpoint, the selected solvent must have low toxicity since traces of the organic solvent always remain in the discharge stream. Further, the selected solvent must be chemically stable, compatible, and relatively inexpensive.

Several solvents have been identified for potential use in the LPP process. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent in the LPP process. The preference of IPA is attributed to its high precipitation ability with different ionic species, favorable properties (boiling point: 32.4° C.; vapor pressure: 478 mmHg at 20° C.); and low environmental risks.

Improving the LPP performance is always a target. One of the essential improvements is to minimize, if not eliminate, the use of the amine solvent. Another improvement is to produce controllable precipitates that are uniformly distributed with high yield and preferably in submicron sizes.

Submicron precipitates are fundamentally stable and form spontaneously if a narrow resistance time distribution is improvised and/or a surface active agent (naturally existing or induced) sufficiently acts as a dispersant to prevent immediate agglomeration of the newly formed precipitates. Submicron precipitates are thus dispersed phase with extreme fluxionality. On the other hand, non-spontaneous unstable macro-size precipitates will form if given sufficient time to rest.

The state (stabile, metastabe, or unstable) of given precipitates can be expressed thermodynamically by the Gibbs-Helmholtz relation as follows:

$$\Delta G = \Delta H - T \Delta S \quad (2)$$

where $\Delta G$ is precipitates free energy (provided by, for instance, mechanical agitation or other means), $\Delta H$ is the enthalpy that represents the binding energy of the dispersed phase precipitates in the aqueous stream, T is the temperature, and $\Delta S$ is the entropy of the dispersed phase precipitates (the state of precipitates disorder). The binding energy ($\Delta H$) can be expressed in terms of the surface tension ($\tau$) and the increase in the surface area ($\Delta A$) as follows:

$$\Delta G = \tau \Delta A - T \Delta S \quad (3)$$

When the introduced free energy into the aqueous stream exceeds the binding energy of precipitates, individual precipitates are broken down and redistributed. In addition, when a surface active agent is present in the aqueous stream as an effective dispersant, $\tau$ is reduced and thus the precipitates binding energy is diminished. Furthermore, part of the introduced energy may not contribute to precipitates deflocculating but it dissipates in the aqueous stream in the form of heat which reduces viscosity. All of these factors increase precipitates disorder (positive entropy). As such, the change in the entropy ($\Delta S$) quantitatively defines precipitates dispersion.

The Compressed-Phase Precipitation (CPP) process is thus developed to achieve sub-micron precipitates in certain applications. CPP is conceptually similar to LPP in which the targeted inorganic species must be nearly insoluble in the amine solvent whereas the mother solvent (water) is miscible with the amine solvent. However, the difference is that fluids in the CPP process can be subjected to pressure and/or temperature manipulations, or fluids modifications to force unusual thermo-physical properties (e.g., exhibit liquid-like density but with higher diffusivity, higher compressibility and lower viscosity).

The fast diffusion combined with low viscosity of the compressed amine solvent into the aqueous phase produces faster supersaturation of targeted ionic species, and their possible precipitation in the desired and sub-micron and micron sizes. Thus, the precipitate-size as well as the precipitate-size distribution, morphology, and crystal structure can be controlled. Achieving faster supersaturation would, in turn, minimize the use of the amine solvent, reduce the size of precipitation vessels, and allow the recovery of targeted ionic species in the desired precipitates shape and distribution. However, several factors could influence the performance of the precipitation process. Among such factors are the origin of aqueous stream along with the identity and initial concentrations of its ionic (charged) species.

Source Water Treatment

In this invention, source water can be innovatively and sufficiently acidified by adding an additive such as aluminum nitrate or iron nitrate. The use of either additive serves several vital processing benefits: (1) it converts bicarbonate to free $CO_2$; (2) it provides a trivalent cation (aluminum or iron) that contributes to the removal of EPS, phosphates, and sulfate from source water upon the addition of a hydrated lime in a further step of the inventive methods; and (3) its anion (nitrate) remains in the treated source water to provide a preferred electron acceptor for anaerobic bacteria that prevent hydrogen sulfide formation and/or reacts with dissolved hydrogen sulfide to form sulfide-based precipitates, which is useful when some of the treated source water is directly used for washing/de-salting crude oil and or water flooding; or indirectly used for water or hot water flooding (e.g., OTSG blow down stream).

Also in this invention, source water can be innovatively and alternatively acidified by using an additive such as calcium nitrate. The use of calcium nitrate provides similar processing benefits to aluminum nitrate or iron nitrate. Additionally, it provides calcium as a divalent cation that contributes to the removal of EPS, phosphates, and sulfate from source water upon the addition of either aluminum hydroxide ($Al(OH)_3$) or iron hydroxide ($Fe(OH)_3$) in a further step of the inventive methods.

Once source water is acidified, the de-carbonation along with the removal of endotoxins and humic substances take place using a stage of hydrophobic membranes. Endotoxins and humic substances are negatively charged under conditions commonly encountered during wastewater treatment. However, proteins carry a net positive charge at pH values below their isoelectric point (pH: 4-5). The addition of aluminum nitrate or iron nitrate to source water would reduce the pH to the required level, and thus would facilitate the separation of endtoxins from proteins within EPS matrices, yet it would also facilitate the reaggregation of endtoxin subunits. On the other hand, the addition of calcium nitrate would not only reduce the pH to the required level but also would provide calcium that binds endotoxins disaggregates to form larger micelles or vesicles (reaggregation). The negatively charged endotoxins would be bound to the hydrophobic membrane whereas the positively charged proteins would be repelled and flow through the membrane with source water.

The precipitation of sulfate (in the form of either calcium sulfoaluminate or calcium sulfoferrate) along with other minor but critical foulants including magnesium, phosphates, EPS (mainly proteins and other negatively charged hydrophilic organic species), silica, transition metals, and boron can then takes place. The precipitation of sulfate in the form of calcium sulfoaluminate can be achieved when: (1) aluminum nitrate and hydrated lime are used; or (2) calcium nitrate and aluminum hydroxide are used. On the other hand, the precipitation of sulfate in the form of calcium sulfoferrate can be achieved when: (1) iron nitrate and hydrated lime are used; or (2) calcium nitrate and iron hydroxide are used. A selected amine solvent can be added to enhance sulfate precipitation (as calcium sulfoaluminate or as calcium sulfoferrate) along with the minor but critical foulants.

This invention is therefore centered on four innovative objectives. The first objective is to properly treat source water, whether it's an effluent stream (biologically treated) from WWTP or WWTRP, or RO concentrate stream from WWTRP by: (1) utilizing the intrinsic characteristics of EPS (pH, charge, hydrophobic nature, and the tendency of endotoxin molecules to form micelles or vesicles) and coupling them with the chemistry of inorganic scale-prone species (bicarbonate, sulfate and phosphate) and permanently contain them in a stable grout (solids sink); and (2) produce suitable source water to feed boilers (including OTSG) and/or other applications.

The second objective is to provide innovative treatment methods if produced water, for instance, is used: (1) to supplement either an effluent stream (biologically treated) from WWTP or WWTRP, or RO concentrate stream from WWTRP as a mixed source water to feed boilers (including OTSG) and/or other applications; or (2) as sole source water to feed boilers (including OTSG) and/or other applications.

The third objective is to make the treated source water by the inventive methods, whether it's an effluent stream or RO concentrate stream or mixed source water or just produced water: (1) directly usable for other applications in oil-fields such as washing/desalting of crude oil, seal/flush utility, and water flooding; and (2) indirectly usable via diverting the OTSG blow down stream (20-25% of OTSG feed water) for oil wells' water flooding (after depleting its thermal energy by heat exchangers) or hot water flooding (by maintaining its thermal energy) to replace, for example, seawater or any other sources of sulfate-rich flood waters.

A further benefit for the third objective of this invention is the control of hydrogen sulfide in aboveground oil gathering centers as well as in downhole oil reservoirs via the direct use (washing/desalting crude oil and water flooding) or indirect use (water or hot water flooding using OTSG blow down stream) of some of the treated source water by the inventive methods. Water flooding, the common Improved Oil Recovery (IOR) method, is often associated with the souring of oil wells caused by injecting sulfate-rich seawater or the like of flood water that leads to microbial production of hydrogen sulfide through sulfate reducing bacteria. Hydrogen sulfide is a toxic and corrosive gas responsible for a variety of economic and environmental problems including reservoirs souring, contamination of the produced oil and gas, corrosion of metal surfaces, and reservoirs plugging due to the precipitation of metal sulfides and the consequent reduction in oil recovery. Hydrogen sulfide problems are widely spread in both oil reservoirs as well as aboveground oil facilities. Therefore, direct or indirect uses of treated source water by the inventive methods have a further benefit of controlling hydrogen sulfide production in aboveground oil facilities (e.g., washing/desalting crude oil) and in downhole oil reservoirs (e.g., water or hot water flooding).

The fourth objective is to provide $CO_2$ as source fluid for Enhanced Oil Recovery (EOR) within oil-fields as an alternative to steam flooding. The two basic economic requirements for a successful steam flooding are the availability of good quality source water and natural gas at reasonable costs, and if one or both of such resources are lacking then steam flooding becomes cost prohibitive. Aside from the economical validity of steam flooding, is the likely damaging impact of steam hydrothermal reactions on carbonate-based deposits (decalcitization, dedolomitization, and dissolution of associated evaporite beds such as gypsum and anhydrite), heavy oil (decarboxylation), and formation water (recarbonation and rescaling). Injection of $CO_2$ as an immiscible or miscible fluid, or in conjunction with hot water, is far less expensive, far less damaging to oil reservoirs (particularly carbonate-based), and environmentally more desirable than steam flooding. The limiting factor that typically precludes the use of $CO_2$ as an EOR fluid is its availability and proximity from oil fields. However, abnormal alkalinity produced waters for example (as given in Table 4) would provide significant amounts of $CO_2$ within oil-fields if the inventive methods are utilized.

Figure 6:
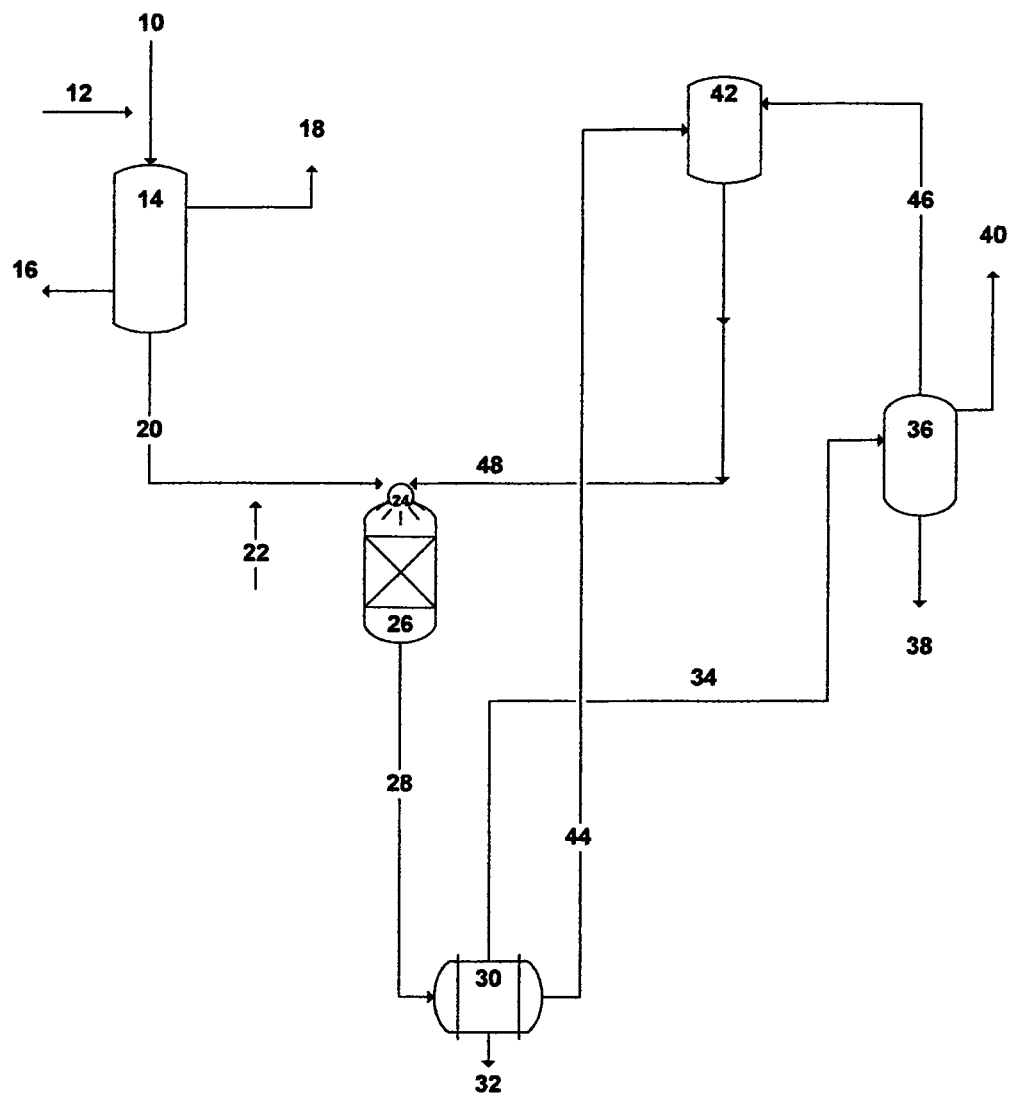
FIG. 6 illustrates a possible flow diagram for the invented methods.

Reference is now made to FIG. 6 that depicts a simplified possible flow diagram illustrating the inventive methods to properly treat source water. Source water would be a derivative stream from wastewater treatment such as: (1) an effluent stream from WWTP or WWTRP; and/or (2) RO concentrate stream from WWTRP.

Pre-filtered source water [10] will be mixed with a sufficient amount of an acidifying additive such as aluminum nitrate or iron nitrate or calcium nitrate [12] to reduce the pH of source water. One of the purposes of such additives is to convert bicarbonate to free $CO_2$, and to make the net charge of proteins in EPS matrices positive. The acidified source water will be fed to the first stage of hydrophobic membranes [14] to deplete endotoxins [16] and $CO_2$ [18] from source water.

The pH of source water that is depleted of endotoxins and $CO_2$ [20] will then be made alkaline by adding a sufficient amount of a hydroxide-based additive. Such an additive would also contribute to the binding and precipitation of sulfate in the form of either calcium sulfoaluminate or calcium sulfoferrate. In the case of using aluminum nitrate or iron nitrate as an acidifying additive, a hydrated lime would be the hydroxide-based additive. In the case of using calcium nitrate as an acidifying additive, on the other hand, aluminum hydroxide or iron hydroxide would be the hydroxide-based additive.

Depleted source water of endotoxins and $CO_2$ [20] will be mixed with a sufficient amount of a hydroxide-based additive (slurry) [22] and introduced into the precipitator unit [26] preferably via the inner tube of at least one concentric nozzle [24]. A selected amine solvent [48] can simultaneously be introduced into the same precipitator unit [26] preferably through the coaxial annulus of the same concentric nozzle [24]. The precipitator unit [26] serves to efficiently precipitate sulfate in the form of either calcium sulfoaluminate or calcium sulfoferrate along with magnesium, phosphates, EPS, silica, transition metals, and boron to produce treated source water.

The outlet stream from the precipitator unit [28] will be fed into a stage of vacuum filters [30] to separate the formed precipitates from source water. The dewatered precipitates [32] will be recovered as a commodity and transferred to a suitable usage site whereas the recovered amine solvent [44] will be recycled to the amine storage tank [42].

The decanted stream [34] from the stage of vacuum filters [30] that contains some of the amine solvent and source water will be fed into the second stage of hydrophobic membranes [36] to strip off the amine solvent [46] and deplete oxygen [40]. The recovered amine solvent [46] will be recycled to the amine storage tank [42]. The properly treated source water [38] can be used to feed OTSG (as well as other applications such as utility boilers, washing/desalting crude oil, fire hydrants, etc.).

Figure 7:
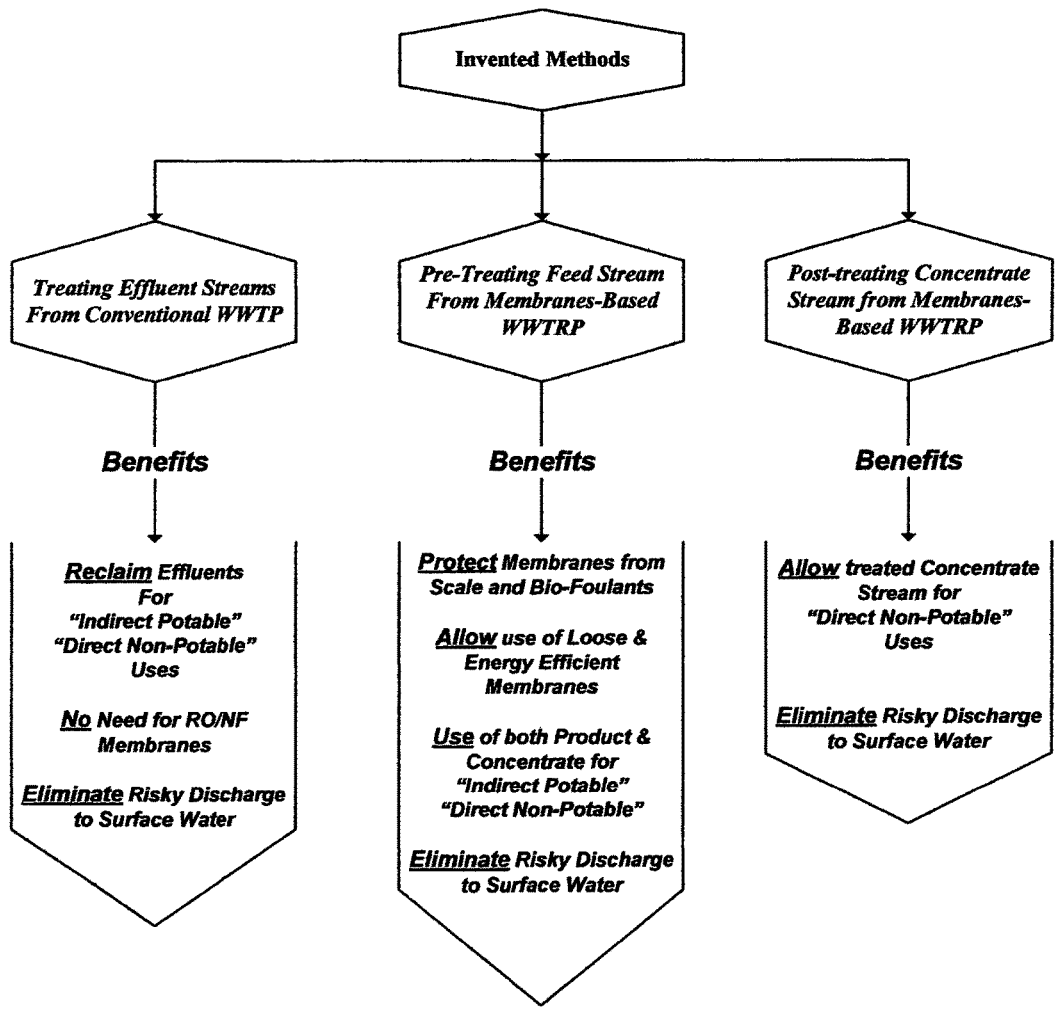
FIG. 7 illustrates the benefits of integrating of the invented methods with WWTP or WWTRP.

The benefits of the inventive methods to treat source water such as an effluent stream from WWTP or WWTRP, or RO concentrate stream from WWTRP are summarized in FIG. 7.

It should be understood that multiple precipitator units can be used as needed to carry out the precipitation step of the inventive methods.

It should also be understood that multiple concentric nozzles can be used as needed in each of precipitator units of the inventive methods.

It should also be understood that the amine solvent, hydroxide-based additive, and source water can be mixed using multiple and separate nozzles.

It should also be understood that the amine solvent, hydroxide-based additive, and source water can be co-introduced via a static mixer or multiple static mixers before entering precipitator units.

It should also be understood that the use of a selected amine solvent might be eliminated. In that case, the process as given in FIG. 6 will be truncated accordingly. A stage of filter presses will replace the stage of vacuum filters. The second stage of hydrophobic membranes [36] will be used for de-oxygenation.

It should also be understood that the anion (nitrate) of the added acidifying additive in the inventive methods remains in the treated source water to control the production, accumulation, and elimination of hydrogen sulfide in both downhole oil reservoirs and aboveground oil facilities. Thus, the added innovative benefit of the selected acidifying nitrate-based additives in this invention is that nitrate provides a viable alternative to replace the use of the conventional broad-spectrum of biocides or inhibitors for eliminating hydrogen sulfide problems. Biocides or inhibitors are often limited in effectiveness and duration, in addition to the fact that biocides pose a substantial environmental hazard).

It should also be understood that the inventive methods can be effectively used to treat effluent streams from WWTP to achieve several technical, economical and environmental benefits by taking advantage of the relatively: (1) low concentrations of scale-prone species and critical EPS which would substantially reduce the capital and operating costs of the inventive methods; and (2) low TDS (~500 mg/L) which would eliminate the need for installing an expensive membranes system (such as RO or NF or a combination of RO-NF) along with its health and environmental liabilities in disposing off their concentrate streams. The treated source water would readily be utilizable for "direct non-potable uses" (e.g., OTSG, utility boilers' makeup, cooling towers, etc.) or "indirect potable uses" (e.g., irrigation or ground water augmentation).

Figure 8:
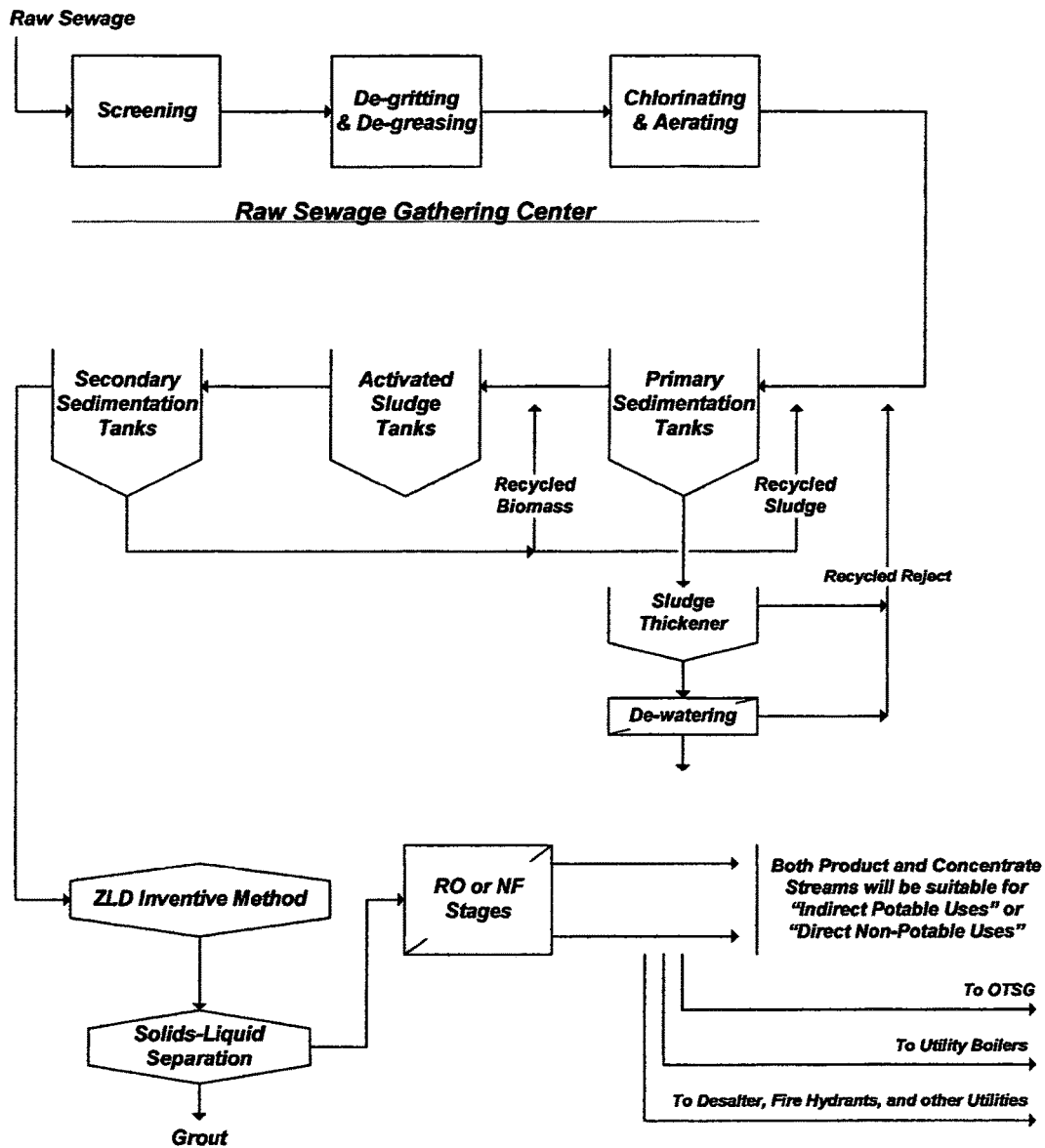
FIG. 8 illustrates the integration of the invented methods with WWTRP to produce readily usable source water for OTSG and other Utilities.

It should also be understood that the inventive methods can be effectively integrated with WWTRP as a pre-treatment for NF or RO membranes, as given in FIG. 8. Such integration would re-shape and improve the practice of membranes as a reclamation step for effluent streams in: (1) allowing the use of loose rather than tight membranes (NF or RO), which would sustain the "underlying operation theme" of the mega-sized membranes-based WWTRP (reduce power consumption, maintain consistent on-line time operation, and extend membranes life); (2) producing higher salinity product stream, rather than the currently produced near distilled water quality (in terms of dissolved ions) that may not be suitable for irrigation since it possesses both low conductivity and low sodium absorption ratio (SAR), which would cause infiltration problems even when applied to coarse soils; (3) making membranes' (NF or RO) concentrate streams readily usable to feed OSTG without further treatment in terms of scale-prone species, EPS and TDS since it's sufficiently depleted of such species, which would resolve the risky discharge of such unwanted streams to surface water and their liabilities at the spot; and (4) avoiding build and operate a nearly redundant yet more complicated new treatment plant for NF or RO concentrate stream.

It should also be understood that a derivative stream from WWTP or WWTRP in some cases might be insufficient as sole source water to feed OTSG, and therefore produced water (as given, for example, in Table 4) could be used to supplement such a derivative stream to form mixed stream as source water. In such situations, source water could be a mixed stream of: (1) an effluent stream from a conventional WWTP or WWTRP along with produced water; or (2) RO concentrate from WWTRP along with produced water. In such cases, the first stage of hydrophobic membranes [14] as given in FIG. 6 would also serve as a de-oiling step (if produced water is not sufficiently de-oiled). The immiscibility of oil content in such mixed stream of source water allows it to permeate through the hydrophobic membranes (as membranes' wetting fluid) whereas the hydrophobic membranes repel source water (as membranes' non-wetting fluid).

It should also be understood that a derivative stream from wastewater treatment might not be available for use as source water, and therefore produced water (Table 4) would be the sole source water. The first stage of hydrophobic membranes [14] in such situation (FIG. 6) would serve as de-oiling [16] and de-carbonation [18] steps.

It should also be understood that the generated substantial amount of $CO_2$ [18] (FIG. 6) from source water can be re-utilized as an immiscible or miscible fluid for EOR instead of steam flooding; or in conjunction with water or hot water flooding, particularly in the case of carbonate-based (calcite, dolomite, etc.) oil reservoirs. For example, roughly about 3,000 metric tons of $CO_2$ will be generated from treating 300,000 barrels/day of the low salinity and abnormal alkalinity produced water (Table 4).

It should also be understood that the precipitation process can be expanded into two stages to use the generated $CO_2$ providing that the acidifying additive is either aluminum nitrate or iron nitrate whereas the hydroxide-based additive is hydrated lime. One of possible ways to conduct the second precipitation stage is to react the de-sulfated and de-foulants stream [34] from the first precipitation stage [26] (FIG. 6) that contains an excess amount of (un-reacted) hydrated lime with the free $CO_2$ [18] from the first stage of hydrophobic membranes [14] to precipitate calcite as follows:

$$CO_2+Ca(OH)_2 \rightarrow CaCO_3+H_2O \qquad (4)$$

Depending on the amount of free $CO_2$, additional amounts of hydrated lime and/or an amine solvent might also be added to aid in completing calcite precipitation.

It should also be understood that the precipitation process can alternatively be expanded into two stages to use the generated $CO_2$ providing that source water is relatively rich with magnesium, and the acidifying additive is either aluminum nitrate or iron nitrate whereas the hydroxide-based additive is hydrated lime. Another possible way to conduct the precipitation in two stages is to allow magnesium to precipitate in the form brucite (magnesium hydroxide) in the first precipitation stage by adding an optimum amount of hydrated lime (with or without the addition of an amine solvent), and react it simultaneously with $CO_2$ [18] from the first stage of hydrophobic membranes [14] to produce magnesium-calcium carbonate (dolomite) as follows:

$$2CO_2+Ca(OH)_2+Mg(OH)_2 \rightarrow CaMg(CO_3)_2+2H_2O \qquad (5)$$

The precipitation of sulfate would then take place in the second stage by adding a further amount of hydrated lime and/or an amine solvent to form calcium sulfoaluminate or calcium sulfoferrate.

It should also be understood that the precipitation process can alternatively be expanded into two stages to use the generated $CO_2$ providing that source water is relatively rich with magnesium, and the acidifying additive is either aluminum nitrate or iron nitrate whereas the hydroxide-based additive is hydrated lime. A further possible way to conduct the precipitation in two stages is to allow magnesium to precipitate in the form brucite in the first precipitation stage by adding only an amine solvent as a precipitation agent, and react it simultaneously with $CO_2$ [18] from the first stage of hydrophobic membranes [14] to produce magnesium carbonate as follows:

$$CO_2+Mg(OH)_2 \rightarrow MgCO_3+H_2O \qquad (6)$$

The precipitation of sulfate would then take place in the second stage by adding a hydroxide-based additive to form calcium sulfoaluminate or calcium sulfoferrate.

It should also be understood that the inventive methods as shown in FIG. 6 can be integrated with thermal-driven or pressure-driven de-salting methods (e.g., Membrane Distillation, Osmotic Membrane Distillation, Multiple Effect, Mechanical Vapor Recompression, Multi-Stage Flash, RO, NF, etc.) in the case of using the relatively high salinity produced water (Table 4) as sole source water, or in the case of distilled water quality is needed as a final product.

It should also be understood that the inventive methods as shown in FIG. 6 can be integrated with ion exchangers to polish, if needed, calcium. Resins of ion exchangers in this case will not be exhausted quickly since source water is sufficiently De-oiled, de-carbonated, de-sulfated, and de-foulants.

TABLE 1

A Survey of OTSG Source Water Specification.

| Parameter (mg/L) | Range of Values |
| --- | --- |
| TDS: | <12,000 |
| TH: | 0.5-1.0 |
| Sulfate: | 10-50 |
| Silica: | 20-150 |
| Iron: | 0.10-0.25 |
| Oxygen: | 0.02-0.05 |
| TSS: | 0.1-2.0 |
| Oil: | 0.5-10 |
| Non-Volatile TOC: | 200-600 |
| pH: | 8.5-11 |

TH: Total Hardness (calcium and magnesium as calcium carbonate).

TABLE 2

Two Years Averaged Samples from WWTRP.

| Species (mg/L) | Activated Sludge Effluent | RO Concentrate Stream |
|---|---|---|
| $Na^+$ | 102.7 | 690.3 |
| $K^+$ | 10.5 | 68.3 |
| $Mg^{+2}$ | 9.3 | 57.6 |
| $Ca^{+2}$ | 37.5 | 223.1 |
| $Sr^{+2}$ | 0.46 | 2.8 |
| $Ba^{+2}$ | 0.02 | 0.11 |
| $Fe^{+2}$ | 0.09 | 0.11 |
| $Cl^-$ | 159.5 | 1050.1 |
| $HCO_3^-$ | 77.9 | 351.6 |
| $NO_3^-$ | 4.3 | 10.1 |
| $SO_4^{-2}$ | 92.5 | 600.3 |
| $PO_4^{-3}$ | 1.9 | 10.6 |
| $SiO_2$ | 1.6 | 10.2 |
| B | 0.25 | 0.52 |
| COD | 191.4 | 295 |
| TDS | 496.6 | 3065.3 |
| TH | 132.5 | 799.2 |
| MH | 38.7 | 241.7 |
| Σ Cations (meq./L) | 7.4 | 47.4 |
| Σ Anions (meq./L) | 7.7 | 47.9 |
| pH | 7.7 | 7.3 |
| T (° C.) | | 35-40 |

MH: Magnesium Hardness (magnesium as calcium carbonate).

TABLE 3

Impairment Species/Compound and their Impact on OTSG.

| Species or Compound | Impact on OTSG |
|---|---|
| Magnesium Hydroxide: | Scale deposit |
| Calcium Carbonate: | Scale deposit |
| Calcium Sulfates: | Scale deposit |
| Calcium Phosphates: | Scale deposit<br>Nutrients to micro-organisms |
| Iron: | Scale deposit<br>Corrosion |
| POM: | Bio-scale deposits (binding with polyvalent cations)<br>Bio-fouling (adherence to metals, resins or membranes)<br>Bio-foaming<br>Precursor for endotoxins<br>Supply substrate for bio-growth in pipelines<br>Resistant to biocides<br>Exert higher oxidants ($O_3$, $H_2O_2$ or UV) demand |
| Ammonia: | Nutrients to micro-organisms<br>Corrosive to copper alloys |
| Oxygen: | Microbial Growth<br>Corrosion |

POM: Microbially Produced Organic Materials.

TABLE 4

Samples of Low-Salinity and Relatively High-Salinity Produced Water.

| Species (mg/L) | Low-Salinity | Low-Salinity | High-Salinity |
|---|---|---|---|
| $Na^+$ | 1,313 | 1,338 | 7,741 |
| $K^+$ | 106 | 121 | 375 |
| $Mg^{+2}$ | 311 | 307 | 595 |
| $Ca^{+2}$ | 1,170 | 1,101 | 2,363 |
| $Sr^{+2}$ | 28 | 32 | 66 |
| $Ba^{+2}$ | 0.02 | 0.03 | 0.1 |
| $Fe^{+2}$ | 0.2 | 0.4 | 0.9 |
| $Cl^-$ | 3,457 | 3,526 | 16,412 |
| $HCO_3^-$ | 1,513 | 1,622 | 247 |
| $SO_4^{-2}$ | 1,200 | 1,207 | 2,966 |
| $SiO_2$ | 7 | 6 | 13 |
| TDS | 7,388 | 9,260 | 30,267 |
| TH | 4,221 | 4,032 | 8,348 |
| MH | 1,296 | 1,279 | 2,479 |
| pH | 6.8 | 6.7 | 7.5 |

What is claimed is:

1. A method for separating endotoxins, foulants, sulfate, and oxygen from source water containing bicarbonate to produce treated source water, said method comprising the steps of: (a) separating carbon dioxide and said endotoxins from said source water by (i) mixing aluminum nitrate or iron nitrate with said source water to convert said bicarbonate to said carbon dioxide and separate said endotoxins from proteins from said water source followed by; (ii) separating said carbon dioxide and said endotoxins from said source water by a first set of hydrophobic membranes to produce de-carbonated and de-toxified source water; (b) separating said foulants and said sulfate from said de-carbonated and de-toxified source water by (i) mixing hydrated lime and an amine solvent with said de-carbonated and de-toxified source water in a precipitator unit to form precipitates comprising calcium sulfoaluminate or calcium sulfoferrate to produce de-foulants and de-sulfated source water; (ii) removing said precipitates from said de-foulants and de-sulfated source water by a vacuum filter; (iii) recovering at least a portion of said amine solvent from said de-foulants and de-sulfated source water by said vacuum filter; (c) separating said oxygen and recovering a further portion of said amine solvent from said de-foulants and de-sulfated source water by a second set of hydrophobic membranes to produce said treated source water.

2. The method of claim 1 wherein said foulants comprises magnesium, phosphates, extracellular polymeric substances (EPS), silica, boron, transition metals, and combinations thereof.

3. The method of claim 1 wherein said source water is an effluent stream is selected from the group consisting of a wastewater treatment plant, an effluent stream from a wastewater treatment and reclamation plant, a reverse osmosis concentrate stream from a wastewater treatment and reclamation plant, a nanofiltration concentrate stream from a wastewater treatment and reclamation plant, an ultrafiltration reject stream from a wastewater treatment and reclamation plant, a microfiltration reject stream from a wastewater treatment and reclamation plant, a sludge thickening/dewatering reject stream from a wastewater treatment plant, a sludge thickening/dewatering reject stream from a wastewater treatment and reclamation plant, an effluent stream from a wastewater treatment plant mixed with produced water from oil-gas production, an effluent stream from a wastewater treatment and reclamation plant mixed with produced water from oil-gas production, a reverse osmosis concentrate stream from a wastewater treatment and reclamation plant mixed with produced water from oil-gas production, and combinations thereof.

4. The method of claim 1 wherein said amine solvent is selected from the group consisting of isopropylamine, propylamine, dipropylamine, diisopropylamine, ethylamine, diethylamine, methylamine, dimethylamine, and combinations thereof.

5. A method for separating endotoxins, foulants, sulfate, and oxygen from source water containing bicarbonate to produce treated source water, said method comprising the steps of: (a) separating carbon dioxide and said endotoxins from said source water by (i) mixing aluminum nitrate or iron nitrate with said source water to convert said bicarbonate to said carbon dioxide and separate said endotoxins from proteins from said water source followed by; (ii) separating said carbon dioxide and said endotoxins from said source water by a first set of hydrophobic membranes to produce de-carbonated and de-toxified source water; (b) separating said foulants and said sulfate from said de-carbonated and de-toxified source water by (i) mixing hydrated lime with said de-carbonated and de-toxified source water in a precipitator unit to form precipitates comprising calcium sulfoaluminate or calcium sulfoferrate to produce de-foulants and de-sulfated source water; (ii) removing said precipitates from said de-foulants and de-sulfated source water by a filter press; (c) separating said oxygen from said de-foulants and de-sulfated source water by a second set of hydrophobic membranes to produce said treated source water.

6. The method of claim 5 wherein said foulants comprise magnesium, phosphates, extracellular polymeric substances (EPS), silica, boron, transition metals, or a combination thereof.

7. The method of claim 5 wherein said source water is an effluent stream is selected from the group consisting of a wastewater treatment plant, an effluent stream from a wastewater treatment and reclamation plant, a reverse osmosis concentrate stream from a wastewater treatment and reclamation plant, a nanofiltration concentrate stream from a wastewater treatment and reclamation plant, an ultrafiltration reject stream from a wastewater treatment and reclamation plant, a microfiltration reject stream from a wastewater treatment and reclamation plant, a sludge thickening/dewatering reject stream from a wastewater treatment plant, a sludge thickening/dewatering reject stream from a wastewater treatment and reclamation plant, an effluent stream from a wastewater treatment plant mixed with produced water from oil-gas production, an effluent stream from a wastewater treatment and reclamation plant mixed with produced water from oil-gas production, a reverse osmosis concentrate stream from a wastewater treatment and reclamation plant mixed with produced water from oil-gas production, and combinations thereof.

8. A method for separating endotoxins, foulants, sulfate, and oxygen from source water containing bicarbonate to produce treated source water, said method comprising the steps of: (a) separating carbon dioxide and said endotoxins from said source water by (i) mixing calcium nitrate with said source water to convert said bicarbonate to said carbon dioxide and separate said endotoxins from proteins from said water source followed by; (ii) separating said carbon dioxide and said endotoxins and from said source water by a first set of hydrophobic membranes to produce de-carbonated and de-toxified source water; (b) separating said foulants and said sulfate from said de-carbonated and de-toxified source water by (i) mixing aluminum hydroxide or iron hydroxide, and an amine solvent with said de-carbonated and de-toxified source water in a precipitator unit to form precipitates comprising calcium sulfoaluminate or calcium sulfoferrate to produce de-foulants and de-sulfated source water; (ii) removing said precipitates from said de-foulants and de-sulfated source water by a vacuum filter; (iii) recovering at least a portion of said amine solvent from said de-foulants and de-sulfated source water by said vacuum filter; (c) separating said oxygen and recovering a further portion of said amine solvent from said de-foulants and de-sulfated source water by a second set of hydrophobic membranes to produce said treated source water.

9. The method of claim 8 wherein said foulants comprise magnesium, phosphates, extracellular polymeric substances (EPS), silica, boron, transition metals, or a combination thereof.

10. The method of claim 8 wherein said source water is an effluent stream is selected from the group consisting of a wastewater treatment plant, an effluent stream from a wastewater treatment and reclamation plant, a reverse osmosis concentrate stream from a wastewater treatment and reclamation plant, a nanofiltration concentrate stream from a wastewater treatment and reclamation plant, an ultrafiltration reject stream from a wastewater treatment and reclamation plant, a microfiltration reject stream from a wastewater treatment and reclamation plant, a sludge thickening/dewatering reject stream from a wastewater treatment plant, a sludge thickening/dewatering reject stream from a wastewater treatment and reclamation plant, an effluent stream from a wastewater treatment plant mixed with produced water from oil-gas production, an effluent stream from a wastewater treatment and reclamation plant mixed with produced water from oil-gas production, a reverse osmosis concentrate stream from a wastewater treatment and reclamation plant mixed with produced water from oil-gas production, and combinations thereof.

11. The method of claim 8 wherein said amine solvent is selected from the group consisting of isopropylamine, propylamine, dipropylamine, diisopropylamine, ethylamine, diethylamine, methylamine, dimethylamine, a and combinations thereof.

12. A method for separating endotoxins, foulants, sulfate, and oxygen from source water containing bicarbonate to produce treated source water, said method comprising the steps of: (a) separating carbon dioxide and said endotoxins from said source water by (i) mixing calcium nitrate with said source water to convert said bicarbonate to said carbon dioxide and separate said endotoxins from proteins from said water source followed by; (ii) separating said carbon dioxide and said endotoxins and from said source water by a first set of hydrophobic membranes to produce de-carbonated and de-toxified source water; (b) separating said foulants and said sulfate from said de-carbonated and de-toxified source water by (i) mixing aluminum hydroxide or iron hydroxide with said de-carbonated and de-toxified source water in a precipitator unit to form precipitates comprising calcium sulfoaluminate or calcium sulfoferrate to produce de-foulants and de-sulfated source water; (ii) removing said precipitates from said de-foulants and de-sulfated source water by a filter press; (c) separating said oxygen from said de-foulants and de-sulfated source water by a second set of hydrophobic membranes to produce said treated source water.

13. The method of claim 12 wherein said foulants comprise magnesium, phosphates, extracellular polymeric substances (EPS), silica, boron, transition metals, and combinations thereof.

14. The method of claim 12 wherein said source water is an effluent stream selected from the group consisting of a wastewater treatment plant, an effluent stream from a wastewater treatment and reclamation plant, a reverse osmosis concentrate stream from a wastewater treatment and reclamation plant, a nanofiltration concentrate stream from a wastewater treatment and reclamation plant, an ultrafiltration reject stream from a wastewater treatment and reclamation plant, a microfiltration reject stream from a wastewater treatment and reclamation plant, a sludge thickening/dewatering reject stream from a wastewater treatment plant, a sludge thickening/dewatering reject stream from a wastewater treatment and reclamation plant, an effluent stream from a wastewater treatment plant mixed with produced water from oil-gas production, an effluent stream from a wastewater treatment and reclamation plant mixed with produced water from oil-gas production, a reverse osmosis concentrate stream from a wastewater treatment and reclamation plant mixed with produced water from oil-gas production, and combinations thereof.

15. A method for separating oil, foulants, sulfate, and oxygen from produced water containing bicarbonate to produce treated source water, said method comprising the steps of: (a) separating said oil and carbon dioxide from said produced water by (i) mixing aluminum nitrate or iron nitrate with said produced water to convert said bicarbonate to said carbon dioxide; (ii) separating said oil and said carbon dioxide from said produced water by a first set of hydrophobic membranes to produce de-oiled and de-carbonated produced water; (b) separating said foulants and said sulfate from said de-oiled and de-carbonated produced water by (i) mixing hydrated lime and an amine solvent with said de-oiled and de-carbonated produced water in a precipitator unit to form precipitates comprising calcium sulfoaluminate or calcium sulfoferrate to produce de-foulants and de-sulfated source water; (ii) removing said precipitates from said de-foulants and de-sulfated source water by a vacuum filter; (iii) recovering at least a portion of said amine solvent from said de-foulants and de-sulfated source water by said vacuum filter; (c) separating said oxygen and recovering a further portion of said amine solvent from said de-foulants and de-sulfated source water by a second set of hydrophobic membranes to produce said treated source water.

16. The method of claim 15 wherein said foulants comprise magnesium, phosphates, strontium, barium, silica, boron, transition metals, or a combination thereof.

17. The method of claim 15 wherein said amine solvent is selected from the group consisting of isopropylamine, propylamine, dipropylamine, diisopropylamine, ethylamine, diethylamine, methylamine, dimethylamine, and combinations thereof.

18. The method of claim 15 wherein said produced water is selected from the group consisting of oil-gas produced water, fracwater from shale oil production, fracwater from shale gas production, bitumen-bed produced water, methane-bed produced water, coal-bed produced water, and combinations thereof.

19. A method for separating oil, foulants, sulfate, and oxygen from produced water containing bicarbonate to produce treated source water, said method comprising the steps of: (a) separating said oil and carbon dioxide from said produced water by (i) mixing aluminum nitrate or iron nitrate with said produced water to convert said bicarbonate to said carbon dioxide; (ii) separating said oil and said carbon dioxide from said produced water by a first set of hydrophobic membranes to produce de-oiled and de-carbonated produced water; (b) separating said foulants and said sulfate from said de-oiled and de-carbonated produced water by (i) mixing hydrated lime with said de-oiled and de-carbonated produced water in a precipitator unit to form precipitates comprising calcium sulfoaluminate or calcium sulfoferrate to produce de-foulants and de-sulfated source water; (ii) removing said precipitates from said de-foulants and de-sulfated source water by a filter press; (c) separating said oxygen from said de-foulants and de-sulfated source water by a second set of hydrophobic membranes to produce said treated source water.

20. The method of claim 19 wherein said foulants comprise magnesium, phosphates, strontium, barium, silica, boron, transition metals, and combinations thereof.

21. The method of claim 19 wherein said produced water is selected from the group consisting of oil-gas produced water, fracwater from shale oil production, fracwater from shale gas production, bitumen-bed produced water, methane-bed produced water, coal-bed produced water, and combinations thereof.

22. A method for separating oil, foulants, sulfate, and oxygen from produced water containing bicarbonate to produce treated source water, said method comprising the steps of: (a) separating said oil and carbon dioxide from said produced water by (i) mixing calcium nitrate with said produced water to convert said bicarbonate to said carbon dioxide; (ii) separating said oil and said carbon dioxide from said produced water by a first set of hydrophobic membranes to produce de-oiled and de-carbonated produced water; (b) separating said foulants and said sulfate from said de-oiled and de-carbonated produced water by (i) mixing aluminum hydroxide or iron hydroxide, and an amine solvent with said de-oiled and de-carbonated produced water in a precipitator unit to form precipitates comprising calcium sulfoaluminate or calcium sulfoferrate to produce de-foulants and de-sulfated source water; (ii) removing said precipitates from said de-foulants and de-sulfated source water by a vacuum filter; (iii) recovering at least a portion of said amine solvent from said de-foulants and de-sulfated source water by said vacuum filter; (c) separating said oxygen and recovering a further portion of said amine solvent from said de-foulants and de-sulfated source water by a second set of hydrophobic membranes to produce said treated source water.

23. The method of claim 22 wherein said foulants comprise magnesium, phosphates, strontium, barium, silica, boron, transition metals, and combinations thereof.

24. The method of claim 22 wherein said amine solvent is selected from the group consisting of isopropylamine, propylamine, dipropylamine, diisopropylamine, ethylamine, diethylamine, methylamine, dimethylamine, and combinations thereof.

25. The method of claim 22 wherein said produced water is selected from the group consisting of oil-gas produced water, fracwater from shale oil production, fracwater from shale gas production, bitumen-bed produced water, methane-bed produced water, coal-bed produced water, and combinations thereof.

26. A method for separating oil, foulants, sulfate, and oxygen from produced water containing bicarbonate to produce treated source water, said method comprising the steps of: (a) separating said oil and carbon dioxide from said produced water by (i) mixing calcium nitrate with said produced water to convert said bicarbonate to said carbon dioxide; (ii) separating said oil and said carbon dioxide from said produced water by a first set of hydrophobic membranes to produce de-oiled and de-carbonated produced water; (b) separating said foulants and said sulfate from said de-oiled and de-carbonated produced water by (i) mixing aluminum hydroxide or iron hydroxide with said de-oiled and de-carbonated produced water in a precipitator unit to form precipitates comprising calcium sulfoaluminate or calcium sulfoferrate to produce de-foulants and de-sulfated source water; (ii) removing said precipitates from said de-foulants and de-sulfated source water by a filter press; (c) separating said oxygen from said de-foulants and de-sulfated source water by a second set of hydrophobic membranes to produce said treated source water.

27. The method of claim 26 wherein said foulants comprise magnesium, phosphates, strontium, barium, silica, boron, transition metals, and combinations thereof.

28. The method of claim 26 wherein said produced water is selected from the group consisting of oil-gas produced water, fracwater from shale oil production, fracwater from shale gas production, bitumen-bed produced water, methane-bed produced water, coal-bed produced water, and combinations thereof.

\* \* \* \* \*